United States Patent
Takemoto et al.

(10) Patent No.: US 8,472,703 B2
(45) Date of Patent: Jun. 25, 2013

(54) IMAGE CAPTURE ENVIRONMENT CALIBRATION METHOD AND INFORMATION PROCESSING APPARATUS

(75) Inventors: Kazuki Takemoto, Kawasaki (JP); Shinji Uchiyama, Yokohama (JP); Takaaki Endo, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/149,231

(22) Filed: May 31, 2011

(65) Prior Publication Data

US 2011/0228103 A1 Sep. 22, 2011

Related U.S. Application Data

(63) Continuation of application No. 11/835,735, filed on Aug. 8, 2007, now Pat. No. 7,974,462.

(30) Foreign Application Priority Data

Aug. 10, 2006 (JP) .................................. 2006-218975

(51) Int. Cl.
*G06T 15/00* (2011.01)

(52) U.S. Cl.
USPC .......................................................... 382/154

(58) Field of Classification Search
None
See application file for complete search history.

(56) References Cited

U.S. PATENT DOCUMENTS

| 6,222,937 | B1 * | 4/2001 | Cohen et al. | 382/154 |
| 8,130,385 | B2 * | 3/2012 | Satoh et al. | 356/620 |
| 2002/0164066 | A1 * | 11/2002 | Matsumoto | 382/154 |
| 2004/0220767 | A1 * | 11/2004 | Tanaka et al. | 702/127 |

* cited by examiner

*Primary Examiner* — Brian P Werner
(74) *Attorney, Agent, or Firm* — Cowan, Liebowitz & Latman, P.C.

(57) ABSTRACT

In a method of calibrating an image capture environment based on a captured image obtained by capturing an image of a physical space by an image capturing unit that captures the image of the physical space, an image of the physical space is captured using the image capturing unit, an index serving as a reference for calibration is detected from the captured image of the physical space, the position and orientation of the image capturing unit are calculated from the detected index, and image capturing unit unique information, geometric information associated with the physical space, or the relationship between the image capturing unit and the physical space is calibrated using the obtained data.

19 Claims, 26 Drawing Sheets

F I G. 19
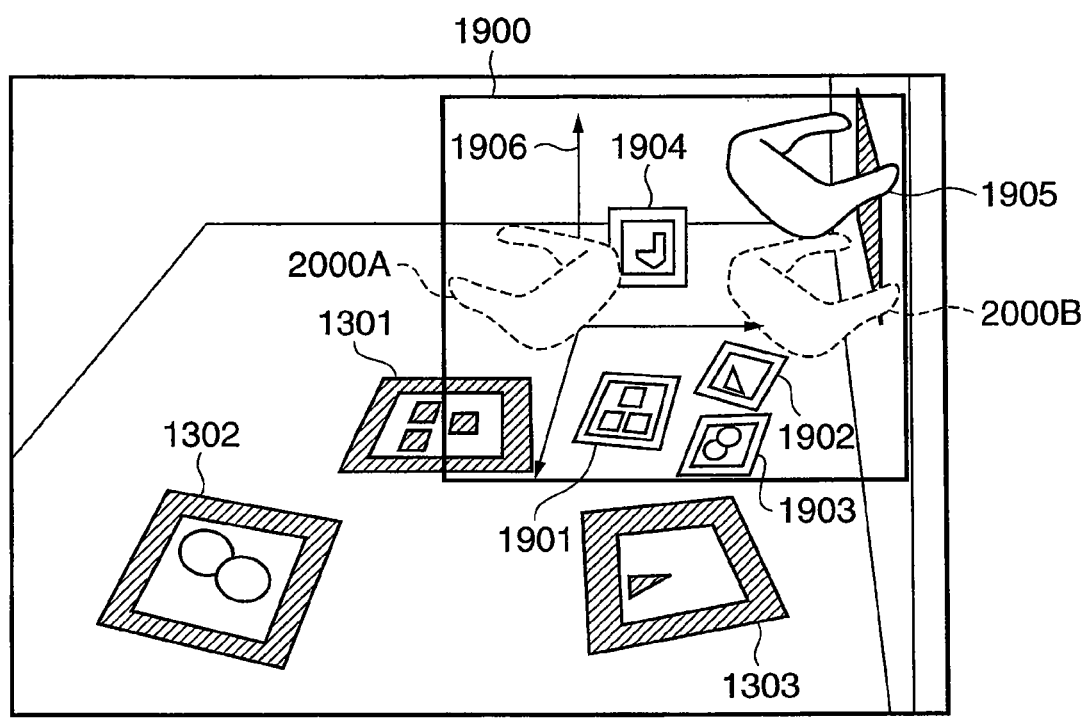

F I G. 21

```
##MARKER DATA

1301 {
  POS(200,0,300)
  ORI(0.5,0.3,0.1)0.0
  PATTERN file1.tif
  SIZE 200
}

1302 {
  POS(300,0,400)
  ORI(0.0,1.0,0.0)−30.0
  PATTERN file2.tif
  SIZE 200
}

1303 {
  POS(300,0,100)
  ORI(1.0,0.0,0.0)−10.0
  PATTERN file3.tif
  SIZE 200
}

1304 {
  POS(200,100,0)
  ORI(1.0,0.0,0.0)90.0
  PATTERN file4.tif
  SIZE 200
}
```

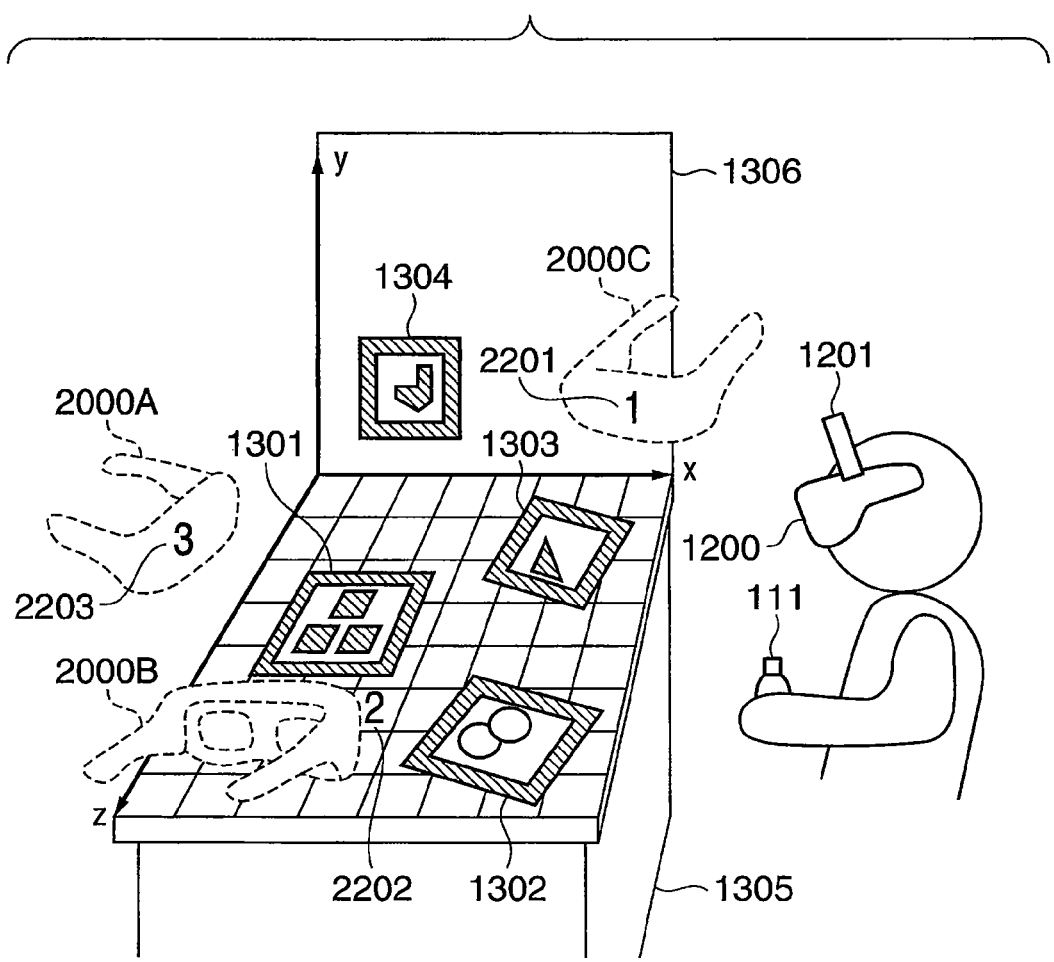
F I G. 22

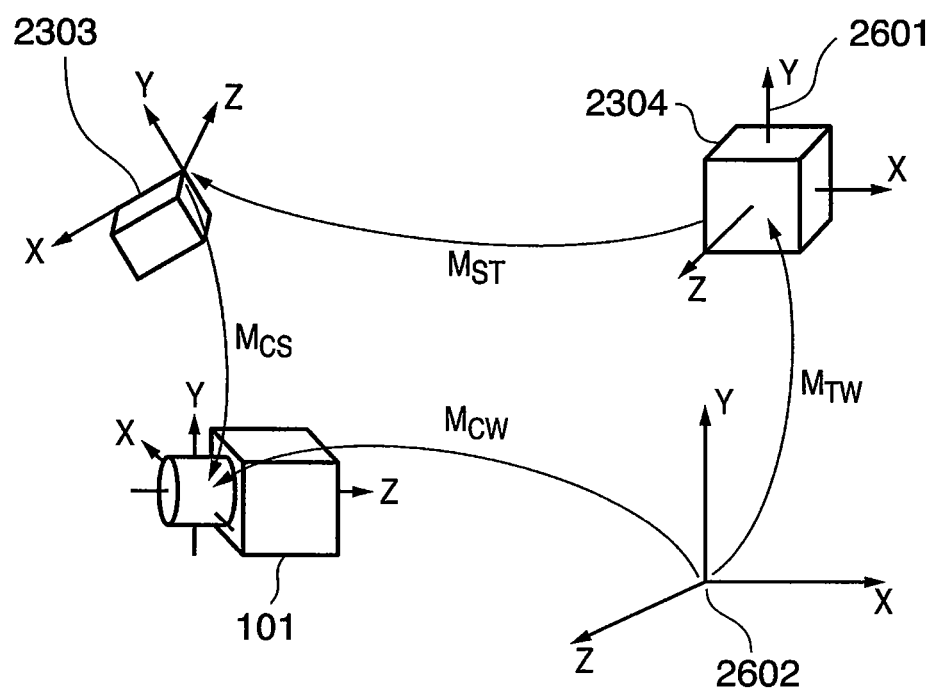
F I G. 26

IMAGE CAPTURE ENVIRONMENT CALIBRATION METHOD AND INFORMATION PROCESSING APPARATUS

CROSS-REFERENCE TO RELATED APPLICATION

This application is a continuation of application Ser. No. 11/835,735, filed Aug. 8, 2007 now U.S. Pat. No. 7,974,462, the entire disclosure of which is hereby incorporated by reference.

BACKGROUND OF THE INVENTION

1. Field of the Invention

The present invention relates to a method of calibrating the shape or the position and orientation of an object on a space, parameters of a camera itself, or the like, based on a captured image.

2. Description of the Related Art

There is known a method of analyzing an image that captures a marker or pattern including a characteristic point whose coordinate value is given in a three-dimensional (3D) space, and calculating the shape or the position and orientation of an object allocated on the 3D space, the intrinsic and extrinsic parameters of the camera itself, or the like. Note that the marker and parameter include not only ones which are artificially allocated but also natural features.

For example, in "Roger Y. Tsai, "A Versatile Camera Calibration Technique for High-Accuracy 3D Machine Vision Metrology Using Off-the-Shelf TV Cameras and Lenses", IEEE Journal of Robotics and Automation, Vol. RA-3, No. 4, pp. 323-344, August 1987" (hereinafter "reference Y. Tsai"), Japanese Patent Laid-Open No. 06-137840, and Japanese Patent Laid-Open No. 2001-325069 (corresponding US 2001/0010514A1), a camera calibration algorithm for calibrating camera intrinsic parameters or camera extrinsic parameters (hereinafter "camera parameters") is disclosed. The camera calibration algorithm of this type estimates camera parameters by generating a teaching point image by capturing an image including a plurality of teaching points which are allocated on a 3D space coordinate system and have given coordinate values, and using the space coordinate values and image coordinate values of the teaching points.

Also, in "Gregory Baratoff, Alexander Neubeck, and Holger Regenbrecht: "Interactive Multi-Marker Calibration For Augmented Reality Applications", Proceedings ISMAR2002, pp. 107-116, 2002" (hereinafter "reference Baratoff et al."), the positions and orientations of a plurality of markers on the 3D space are calibrated by capturing images of markers serving as indices used for alignment of mixed reality (MR) a plurality of times from various directions.

In this way, with the methods using an image of the marker or pattern allocated on the 3D space to calibrate the camera parameters or the shape or the position and orientation of an object on the space from the image, the input image that captures the pattern or marker influences the final precision.

For example, the method of reference Y. Tsai is distinguished in that the calibration precision is impaired when the pattern is captured from a direction normal to the pattern. Also, the method that improves the estimation precision of the camera parameters using a plurality of pattern images is distinguished in that the precision cannot be expected to improve if only images obtained by capturing the pattern from similar directions are used. With the marker calibration by the method of reference Baratoff et al., if images to be used do not include a given marker, the position and orientation of the marker cannot be calibrated, and the total calibration precision drops in some cases. Thus, when the user who does not know the calibration mechanism captures images of the pattern or marker, appropriate calibration may often be disabled.

SUMMARY OF THE INVENTION

The present invention has been made in consideration of the aforementioned problems, and one exemplary embodiment of the present invention provides an information processing apparatus and image capture environment calibration method, which reduce input errors of image data that may induce calibration precision drop and can improve the calibration precision upon calculating the camera parameters, or the shape, allocation information, or the like of an object on a physical space using an image.

According to one aspect of the present invention, there is provided a method of calibrating an image capture environment based on a captured image obtained by capturing an image of a physical space by an image capturing unit that captures the image of the physical space, the method comprising:

an imaging step of capturing an image of the physical space using the image capturing unit;

a detecting step of detecting an index serving as a reference for calibration from the captured image of the physical space;

a calculating step of calculating a position and orientation of the image capturing unit from the index detected in the detecting step;

a presenting step of presenting a virtual three-dimensional object which designates the next target position and orientation of the image capturing unit required to acquire calibration information; and a calibrating step of calibrating one of image capturing unit unique information, geometric information associated with the physical space, and a relationship between the image capturing unit and the physical space using the index detected in the detecting step.

Furthermore, according to another aspect of the present invention, there is provided an information processing apparatus for calibrating an image capture environment based on a captured image obtained by capturing an image of a physical space by an image capturing unit that captures the image of the physical space, the apparatus comprising:

an imaging unit adapted to capture an image of the physical space;

a detecting unit adapted to detect a target object serving as an index from the image captured by the imaging unit;

a measuring unit adapted to measure a position and orientation of the imaging unit;

a designating unit adapted to present a target position and orientation of the image unit to a user using a virtual three-dimensional object; and a calibrating unit adapted to execute calibration using the index detected by the detecting unit.

Further features of the present invention will become apparent from the following description of exemplary embodiments with reference to the attached drawings.

BRIEF DESCRIPTION OF THE DRAWINGS

FIG. 19 illustrates an image to be presented to the user upon using an image capture environment calibration method according to the fifth embodiment;

FIG. 21 is a list showing marker data according to the fourth embodiment;

FIG. 22 is a view illustrating the use state of an image capture environment calibration method according to the seventh embodiment;

FIG. 26 is a view showing the relationship among sensor allocation information, a reference coordinate system, and a sensor coordinate system according to the ninth embodiment.

DESCRIPTION OF THE EMBODIMENTS

Preferred embodiments of the present invention will now be described in detail in accordance with the accompanying drawings.

Note that the following embodiments will explain a case wherein the image capture position and orientation required to calibrate camera parameters and the position and orientation of a marker are designated using a display for a workstation and a camera. The present invention is not limited to calibration of the camera parameters or the position and orientation of the marker. For example, the present invention can be applied to all parameter calibration methods whose calibration precision depends on the position and orientation of an image capturing device that captures an image of a marker or pattern serving as a reference (e.g., calibration of sensor allocation information using marker allocation information), as can be apparent from the following description. Also, the present invention is not limited to the display for the workstation, but can be applied to a video see-through HMD or an optical see-through HMD attached with a camera, as can be apparent from the following description.

[First Embodiment]

Figure 1:
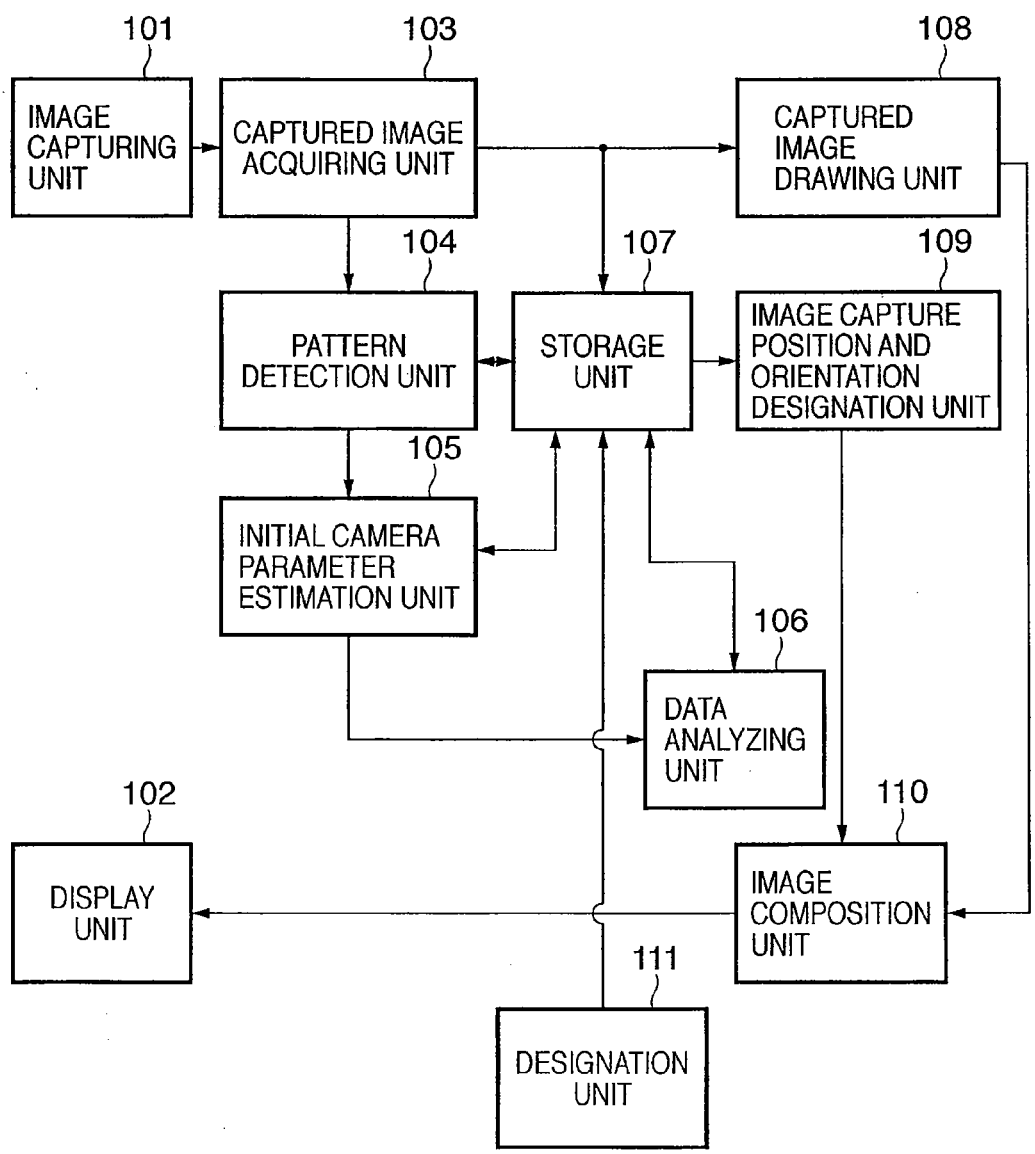
FIG. 1 is a block diagram showing the functional arrangement of the first embodiment.
Figure 2:
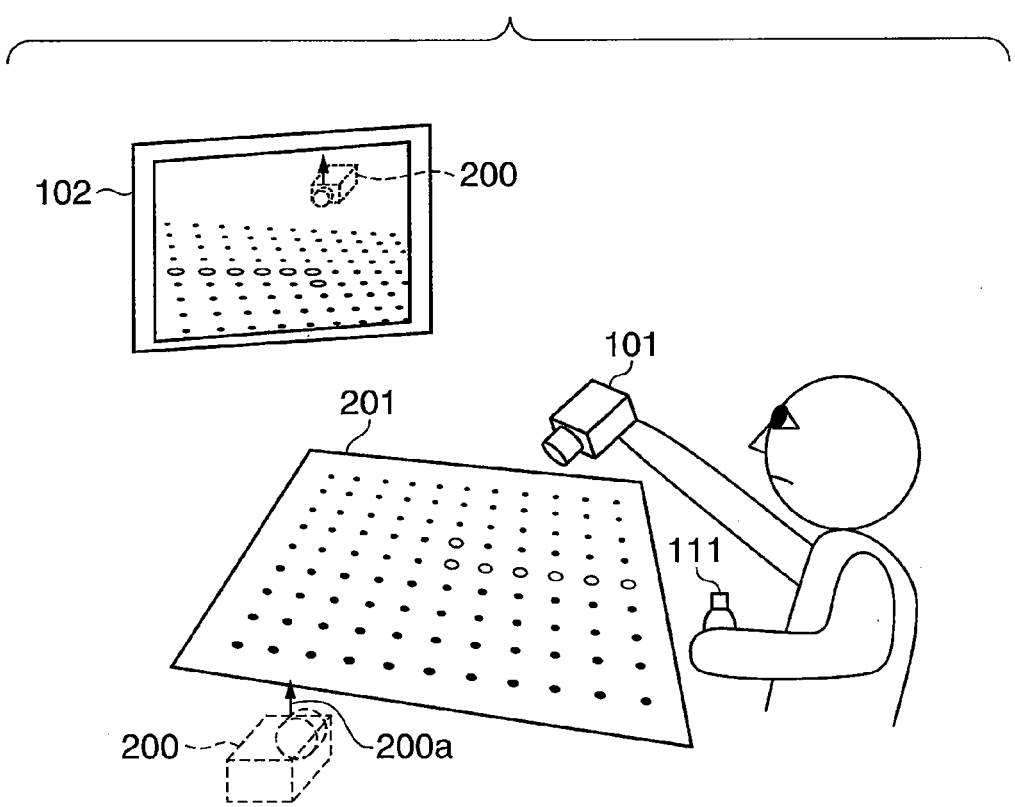
FIG. 2 is a view illustrating the use state of an image capture environment calibration method according to the first embodiment.
Figure 3:
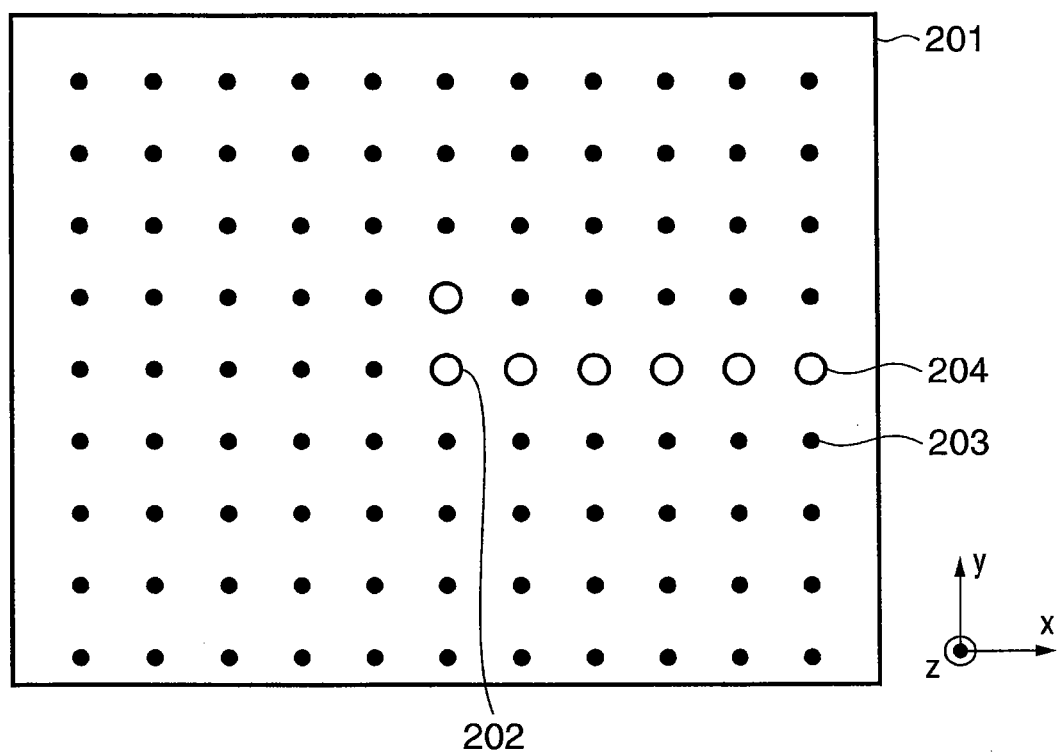
FIG. 3 shows a calibration pattern according to the first embodiment.

FIG. 1 is a block diagram showing the functional arrangement of a calibration apparatus according to the first embodiment, and FIG. 2 illustrates the use state of an image capture environment calibration method according to the first embodiment. In FIGS. 1 and 2, the same reference numerals denote the same components. FIG. 3 shows a calibration pattern according to the first embodiment.

In the following embodiments, calibration of image capturing unit unique information (camera intrinsic parameter calibration), or of geometric information associated with a physical space (marker calibration), or of the relationship between the image capturing unit and physical space (sensor calibration), is executed.

Reference numeral 101 denotes an image capturing unit, which uses a color CCD camera according to the embodiment. However, the present invention is not limited to the color CCD camera as the type of the image capturing unit 101. For example, the present invention can be applied to any other devices as long as they can generate a captured image that the user can recognize as the physical space, upon capturing an image of the physical space.

According to the embodiment, the image capturing unit 101 captures an image of a calibration pattern 201 shown in FIG. 3, which is allocated at a given position on the physical space. The calibration pattern 201 includes two different patterns, i.e., black circle patterns 203 and black and white concentric circle patterns 204. The patterns are provided to estimate the position and orientation of the image capturing unit 101 itself, which captures the image of the calibration pattern 201, and the seven black and white concentric circle patterns 204 are provided to indicate the directionality of the whole pattern. The circle patterns 203 and concentric circle patterns 204 of the calibration pattern 201 are allocated in a grid pattern. In order to recognize a pattern from the captured image of the calibration pattern 201, an image including three or more black and white concentric circle patterns 204 arranged in an L shape, as shown in FIG. 3, and a central point 202 as the central concentric circle pattern, must be captured. Note that the coordinate system on the calibration pattern 201 is defined as follows. That is, the central point 202 as the central concentric circle pattern is defined as an origin, the arrangement direction of the six concentric circle patterns 204 is defined as an x-axis direction, the arrangement direction of the two concentric circle patterns 204 is defined as a y-axis direction, and a direction normal to the calibration pattern 201 is defined as a z-axis direction.

Referring back to FIG. 1, reference numeral 102 denotes a display unit, which uses a display for a workstation according to the first embodiment. Note that the present invention does not depend on such display device. For example, the present invention can be applied to any other display devices, such as an LCD display incorporated in an HMD and the like, as long as they can make a display that allows the user to confirm the designation position and orientation from a captured image of the physical space and a camera object 200 (FIG. 2) superimposed on the image.

Reference numeral 103 denotes a captured image acquiring unit, which holds a captured image captured by the image capturing unit 101 in a storage unit 107 as image data. Reference numeral 104 denotes a pattern detection unit, which detects the calibration pattern 201 from image data obtained by the captured image acquiring unit 103, and stores two-dimensional (2D) image positions of respective points on the detected calibration pattern 201 in the storage unit 107.

Reference numeral 105 denotes an initial camera parameter estimation unit, which tentatively estimates initial camera parameters, including extrinsic and intrinsic parameters of the image capturing unit 101, from the 2D image positions of the point on the calibration pattern 201 detected by the pattern detection unit 104. Note that the extrinsic parameters indicate the position and orientation of the image capturing unit 101 on the 3D space and the like. The intrinsic parameters indicate the focal length, principal point, lens distortion center, lens distortion coefficient, and the like, and are also called image capturing unit unique information. The estimation processing of the initial camera parameters will be described hereinafter. The initial camera parameters as the estimation result are stored in the storage unit 107.

Reference numeral 106 denotes a data analyzing unit that analyzes the acquired image for the camera calibration, and presents an image capture position and orientation at which the next image is to be captured. The image capture position and orientation calculated by data analysis (hereinafter "designation position and orientation") are stored in the storage unit 107. The content of the data analysis processing will be described hereinafter.

The storage unit 107 holds information required for the processing of the image capture environment calibration method according to the embodiment, and executes read and write processes according to the processing. Note that the information required for the processing of the image capture environment calibration method according to the embodiment includes:

the camera intrinsic parameters of the camera initial parameters, and those after calibration;

the saved captured image, and the image capture position and orientation stored in association with the saved captured image;

the vertex information (information required to draw a virtual object, which includes the 3D positions defined on a reference coordinate system and connection information of respective vertices) of a virtual object to be drawn for the purpose of position and orientation presentation;

the 2D positions of respective vertices of the pattern detected from the captured image;

a sequence for storing logs of the designated positions and orientations of the image capturing unit; and information such as settings upon pressing of buttons of a pointing device (e.g., pressing of a left button: image acquisition and saving, and pressing of a right button: start of the camera calibration), and the like.

Reference numeral 108 denotes a captured image drawing unit which draws image data of the captured image output from the captured image acquiring unit 103, and sends it to an image composition unit 110. Reference numeral 109 denotes an image capture position and orientation designation unit, which draws a camera object 200 in FIG. 2 and an OK mark 1001 in FIG. 10 according to the image capture position and orientation designated by the data analyzing unit 106, read out from the storage unit 107. Note that the present invention is not limited to drawing of an object having a video camera shape such as the camera object 200, and any other objects may be drawn as long as they have display forms that allow the user personally to confirm the position and orientation of the image capturing unit 101.

The image composition unit 110 composites the image of the image capture position and orientation designation unit 109 to have the captured image drawn by the captured image drawing unit 108 as a background, and displays a composite image on the display unit 102.

Reference numeral 111 denotes a designation unit, which serves as a designation tool used by the user upon acquiring an image used in the camera calibration or upon calculating the camera calibration in practice. According to the embodiment, a hand-held pointing device having right and left buttons is used as the designation unit 111. As described above, according to the settings in the storage unit 107, clicking of the left button is interpreted as an acquisition/saving instruction of the captured image, and that of the right button is interpreted as a start instruction of the camera calibration.

FIG. 2 is a view illustrating the use state of the image capture environment calibration method according to the first embodiment. Reference numeral 200 denotes a camera object, which indicates the image capture position and orientation (designation position and orientation) of the image capturing unit 101 so as to capture the next image to be captured. By superimposing the camera object 200 on the captured image captured by the image capturing unit 101, the camera object 200 presents the designation position and orientation to the user. The camera object 200 includes an indication of a vector 200a, which indicates the upper direction of the camera so as to allow the user to determine the upper and lower directions of the camera object. As shown in FIG. 2, the calibration pattern 201 is allocated on the physical space, and its image is captured by the image capturing unit 101.

A brief processing sequence of the image capture environment calibration method implemented by the functional arrangement shown in the block diagram of FIG. 1 will be described hereinafter, with reference to the flowchart shown in FIG. 4.

In step S400, the captured image acquiring unit 103 receives an image signal obtained by capturing an image of the physical space by the image capturing unit 101, and converts it into image data. In step S401, the pattern detection unit 104 recognizes and detects the calibration pattern 201 allocated on the physical space. In the detection processing, the captured image including the calibration pattern 201 is binarized to be separated into black and white regions. Next, black and white regions in each of which the barycentric position of the white region is close to the black region are recognized as the black and white concentric circle patterns 204, and the calibration pattern 201 is recognized based on the arrangement of the black and white concentric circle patterns on the image.

A check is performed in step S402 to determine whether or not the recognition in step S401 has succeeded. If the pattern detection unit 104 has succeeded the recognition of the calibration pattern 201, the process advances to step S403. If the pattern detection unit 104 has failed the recognition, the process returns to step S400.

In step S403, the initial camera parameter estimation unit 105 tentatively derives the camera intrinsic parameters and camera extrinsic parameters of the image capturing unit 101 required to draw a 3D guide CG used to present the image capture position and orientation. The currently captured image (image captured in step S400) is used to derive the parameters. The tentatively derived camera intrinsic parameters and camera extrinsic parameters will be referred to hereinafter as "initial camera parameters". Upon deriving the initial camera parameters, for example, a method described in, e.g., Japanese Patent Laid-Open No. 06-137840, Japanese Patent Laid-Open No. 05-274426 (corresponding U.S. Pat. No. 5,444,799), and the like may be used. The patent references disclose a method for calculating the camera intrinsic parameters and camera extrinsic parameters using a plurality of teaching points on the calibration pattern 201, which are two-dimensionally distributed and have given 3D positions.

Of the initial camera parameters, if respective parameters of the camera intrinsic parameters fall within the allowable value ranges, the initial camera parameters are saved in the storage unit 107, and the process advances to step S404. The initial camera parameter estimation unit 105 also checks in step S403 as to whether or not the initial camera parameters are saved in the storage unit 107 at the beginning of the processing. If the initial camera parameters are already saved, the initial camera parameter estimation unit 105 loads the saved camera intrinsic parameters from the storage unit 107, and derives only the camera extrinsic parameters. After that, the process advances to step S404.

On the other hand, in calculations of the initial camera parameters, if the parameters of the camera intrinsic parameters fall outside the allowable ranges, the calculated initial camera parameters are discarded, and the process advances to step S408. Note that the user may input the allowable value ranges of the respective parameters in advance in accordance with the type of camera, or an operator other than the user may store them in the storage unit 107.

Figure 10:
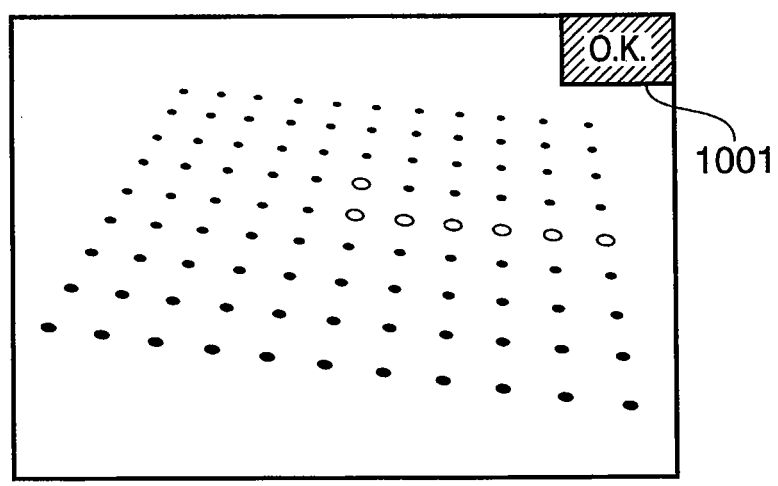
FIG. 10 shows an example of an OK mark 100 indicating that the current image capture position and orientation are close to the designation position and orientation of the first embodiment.

A verification is performed in step S404 as to whether or not difference between the designation position and orientation stored at the last position in the log sequence of the designated positions and orientations stored in the storage unit 107, and the current position and orientation of the image capturing unit 101 fall within a threshold range. If they fall within the threshold range, the process advances to step S407 to display the OK mark 1001 on the upper right corner of the screen, as shown in FIG. 10. If it is determined in step S404 that difference between the designation position and orientation, and the current position and orientation of the image capturing unit 101 fall outside the threshold range, or if the designation position and orientation are not stored in the storage unit 107, the process advances to step S405.

In step S405, the next designation position and orientation to be designated for the user are calculated with reference to the logs of the designation positions and orientations stored in the storage unit 107. Of the initial camera parameters calculated in step S403, the camera extrinsic parameters indicating the relative position and orientation to the calibration pattern 201 are referred to first. Furthermore, a latitude $\pi/2-\theta$, longitude $\phi$, and distance r from the position (x, y, z) of the image capturing unit 101 with respect to a polar coordinate system of a hemisphere which has the central point of the calibration pattern 201 as the center and the plane of the calibration pattern 201 as the bottom plane are calculated by:

$$r = \sqrt{x^2 + y^2 + z^2}$$

$$\varphi = \tan^{-1}\left(\frac{y}{x}\right)$$

$$\theta = \cos^{-1}\left(\frac{z}{\sqrt{x^2 + y^2 + z^2}}\right) \quad (1)$$

Next, the designation position and orientation are set at a position as the sum of the longitude and, e.g., 20°, while maintaining the latitude of the image capturing unit 101. When the longitude value becomes equal to or larger than 85°, it is set to be 20°. According to the embodiment, the calibration pattern 201 shown in FIG. 3 is used, and it is desirable to execute image capturing in increments of 20° within the range 0°<φ<90°. Furthermore, the polar coordinate system is converted into an orthogonal coordinate system by:

$$x = r \sin\theta \cos\phi$$

$$y = r \sin\theta \sin\phi$$

$$z = r \cos\theta \quad (2)$$

Next, a world coordinate system is converted into a camera coordinate system, and the designation position and orientation undergo rotation conversion through 90° in the axis of sighting direction of the image capturing unit 101. The rotation conversion is given by:

$$\begin{bmatrix} \cos\left(\frac{\pi}{2}\right) & -\sin\left(\frac{\pi}{2}\right) & 0 & 0 \\ \sin\left(\frac{\pi}{2}\right) & \cos\left(\frac{\pi}{2}\right) & 0 & 0 \\ 0 & 0 & 1 & 0 \\ 0 & 0 & 0 & 1 \end{bmatrix} \quad (3)$$

Figure 9:
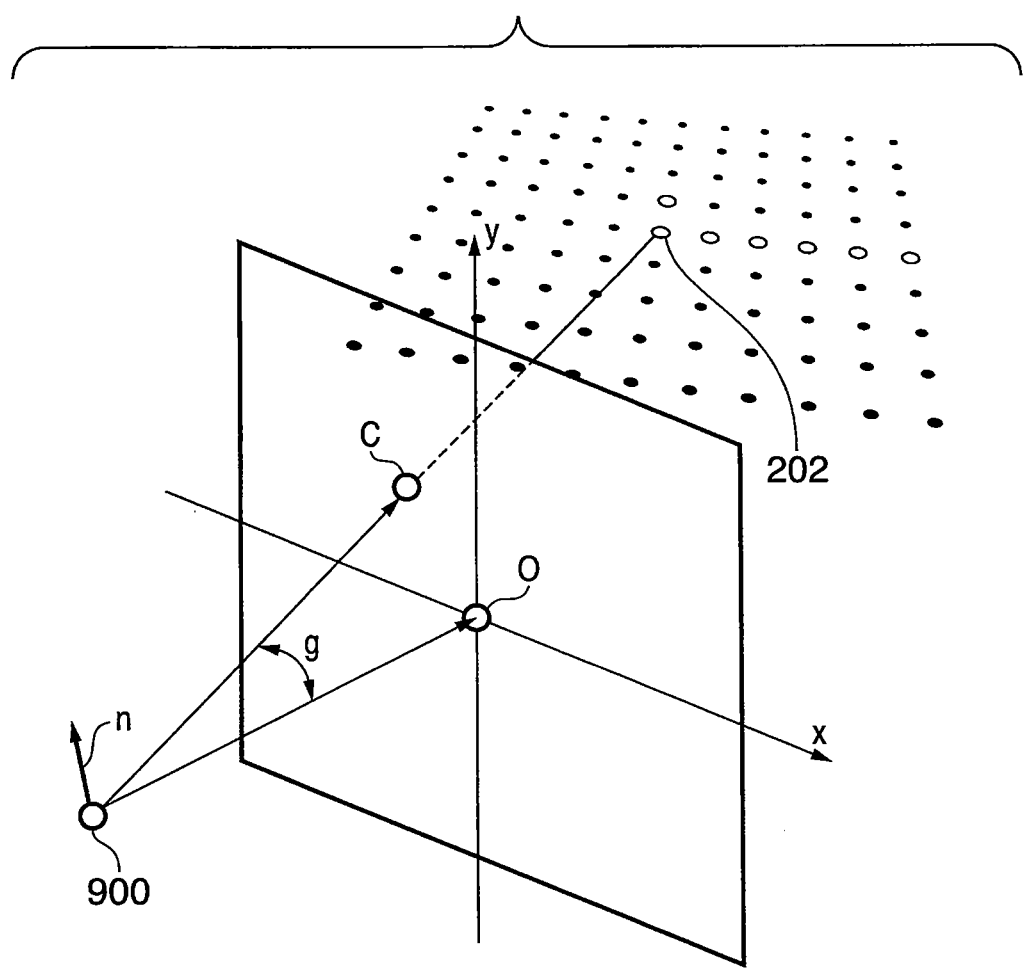
FIG. 9 is a view for explaining rotation of the designation position and orientation of the first embodiment so that the central point of the calibration pattern matches the image center of an image capturing unit indicated by the designation position and orientation.

In order to set an orientation at which an image center O of the image capturing unit 101 passes through the central point 202 of the calibration pattern 201, as shown in FIG. 9, the designation position and orientation undergo rotation conversion given by:

$$\begin{bmatrix} n_x^2(1-\cos g) + \cos g & n_x n_y(1-\cos g) - n_z \sin g & n_x n_z(1-\cos g) + n_y \sin g & 0 \\ n_x n_y(1-\cos g) + n_z \sin g & n_y^2(1-\cos g) + \cos g & n_y n_z(1-\cos g) - n_x \sin g & 0 \\ n_x n_z(1-\cos g) - n_y \sin g & n_y n_z(1-\cos g) + n_x \sin g & n_z^2(1-\cos g) + \cos g & 0 \\ 0 & 0 & 0 & 1 \end{bmatrix} \quad (4)$$

where $n(n_x, n_y, n_z)$ is a rotation axis vector upon rotating an image coordinate value C of the central point 202 on the camera coordinate system to an origin on the image coordinate system, and g is the rotation angle at that time. By designating to capture images from various directions, calibration pattern images which are optimal to the camera calibration and have variations of depth directions and vanishing point directions can be acquired.

The designation position and orientation calculated last are stored at the end of the log sequence of the designation positions and orientations in the storage unit 107.

In step S406, a 3D guide CG indicating the position and orientation of the image capturing unit 101 to make the user capture the next image of the calibration pattern is displayed. The designation position and orientation stored at the end of the log sequence of the designation positions and orientations are read out from the storage unit 107, and shape information of a virtual object in the storage unit 107 is read out, so as to draw the virtual object with the designation position and orientation as a virtual space image. With the processing in step S406, the appropriate image capture position and orientation can be guided for the user. If the 3D guide CG is controlled not to disappear until all appropriate pattern images are obtained, acquisition errors of the appropriate pattern images can be avoided. Although not shown in the flowchart, the 3D guide CG may be cleared when all the appropriate pattern images are captured. Or a message indicating that all the appropriate pattern images are captured may be notified on the screen. When the number of log sequences of the designation positions and orientations exceeds a predetermined value, it can be determined that the appropriate pattern images are captured.

In step S407, the OK mark 1001 is displayed, as shown in FIG. 10, so as to inform the user that one of appropriate pattern images can be captured at the current position and orientation of the image capturing unit. Note that the present invention is not limited to the display form shown in FIG. 10, and any other display forms can be applied as long as the user can confirm that he or she can capture an image of the calibration pattern 201 at the current position and orientation.

In step S408, the image composition unit 110 composites the images generated by the captured image drawing unit 108 and image capture position and orientation designation unit 109, draws the composite image, and presents that image on the display unit 102.

It is checked in step S409 if an event that instructs to save the image (pressing of the left button of the hand-held mouse) is produced by the designation unit 111 held by the user. If the event that instructs that the image be saved is produced, the process advances to step S413. On the other hand, if the event is not produced, the process advances to step S410.

In step S413, the image that includes the captured pattern image is saved in the storage unit 107, and the process returns to step S400.

A check is made in step S410 as to whether or not an event that instructs that the camera calibration (pressing of the right button of the hand-held mouse) be initiated is produced by the designation unit 111 held by the user. If a plurality of target positions and orientations are acquired, 3D guide CGs indicating all the target positions and orientations are displayed. The CGs are cleared in turn from the target position and orientation which have undergone the image capture. Therefore, the 3D guide CGs remain displayed until all appropriate pattern images are obtained. Therefore, since the user issues the camera calibration start instruction after he or she confirms that all of the 3D guide CGs are cleared, acquisition errors of appropriate pattern images can be avoided. Note that all the target positions and orientations may be displayed at the same time, or the target position and orientation may be updated and displayed one by one every time an image is captured at the position and orientation. If the event that instructs that the camera calibration be initiated is produced, the process advances to step S411; otherwise, the process returns to step S400.

In step S411, the position and orientation of the image capturing unit 101 are calculated for each of the plurality of pattern images stored in the storage unit 107 so as to precisely calculate the intrinsic parameters of the image capturing unit 101. The points of the calibration pattern 201 are projected onto the pattern images with reference to the calculated positions and orientations. Then, the camera intrinsic parameters are calculated to minimize the sum of errors between the projected points and corresponding points on the actual pattern images, thus obtaining optimal values. Note that the aforementioned calibration processing can use known estimation processing, and a detailed description thereof will not be given. In step S412, the intrinsic parameters calculated in step S411 are saved in the storage unit 107.

Figure 4:
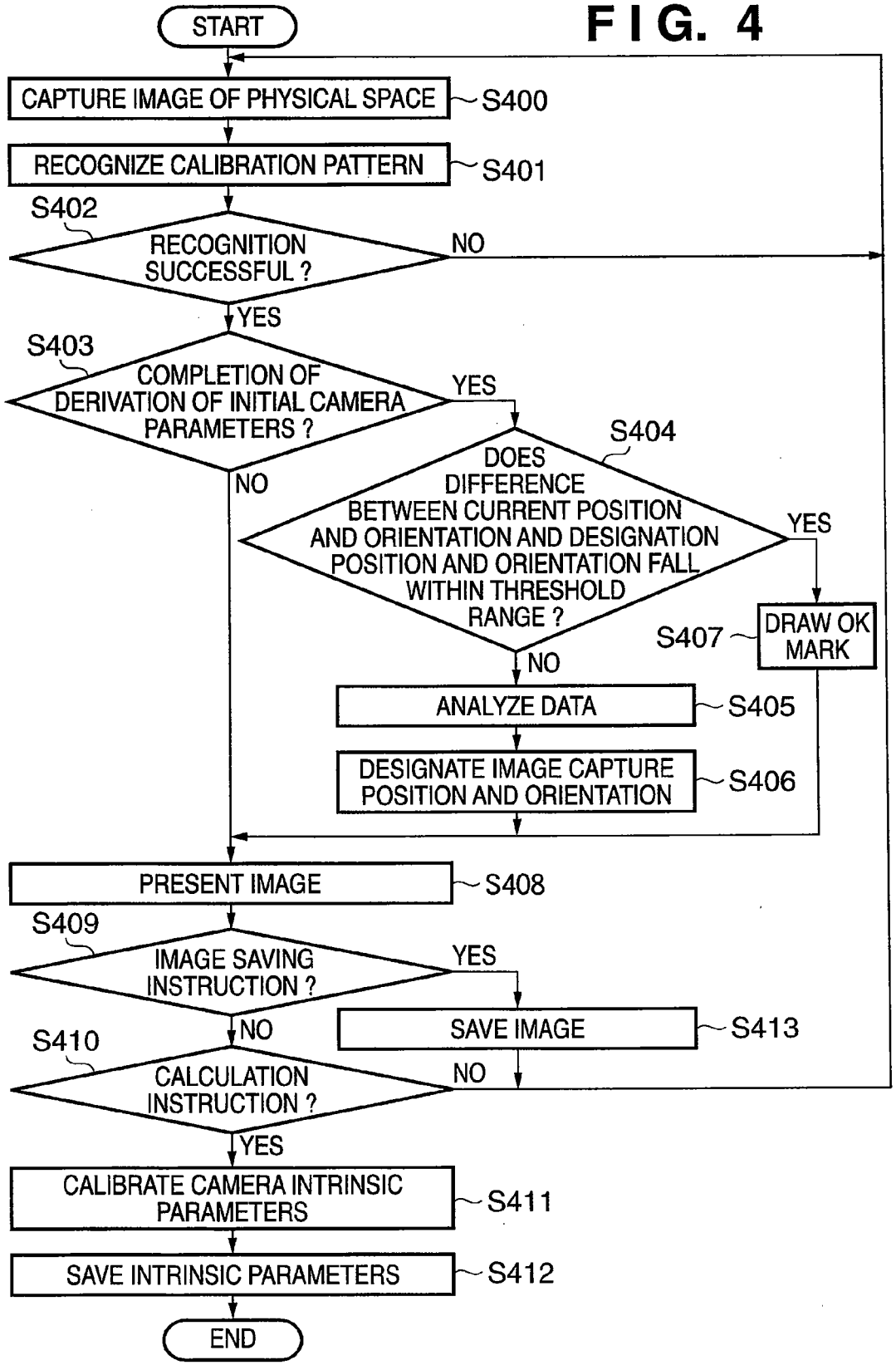
FIG. 4 is a flowchart showing a brief processing sequence according to the first embodiment.

As described above, according to the embodiment, the image capture positions and orientations required to capture image patterns suited to the processing in step S411 in FIG. 4, which calculates optimal camera intrinsic parameters from a plurality of image patterns are designated. Thus, even the user who does not understand the mechanism of the camera calibration can execute the camera calibration without any decline in precision.

[Second Embodiment]

In the first embodiment, the current position and orientation of the image capturing unit 101 are converted into those on the polar coordinate system, and the converted position and orientation undergo rotation in the latitude direction and that about the axis of sighting of the image capturing unit 101 on the polar coordinate system, thus calculating the designation position and orientation. However, the present invention is not limited to such specific calculation method of the designation position and orientation, and may be applied to any other methods as long as they can calculate the designation positions and orientations so as to make the user capture a pattern from various directions. For example, a method of analyzing the vanishing point directions of the captured images stored in the storage unit 107 and calculating the designation position and orientation based on the analysis result may be used. The second embodiment will exemplify a case wherein this calculation method is applied to the image capture environment calibration method of the present invention. Note that differences from the first embodiment will be mainly described hereinafter.

The functional arrangement of the calibration apparatus according to the second embodiment is the same as that in the first embodiment (FIG. 1). As a difference from the first embodiment, the vanishing point directions of saved images are added as information stored in the storage unit 107.

The processing sequence of the image capture environment calibration method according to the second embodiment will be described below with reference to the flowchart shown in FIG. 4. The difference between the processing of the second embodiment and that of the first embodiment lies in step S405. In step S405 of the second embodiment, the vanishing point directions of pattern images are calculated with reference to the pattern images stored in the storage unit 107. The processing in step S405 according to the second embodiment will be described below with reference to the flowcharts shown in FIGS. 5 and 6.

Figure 5:
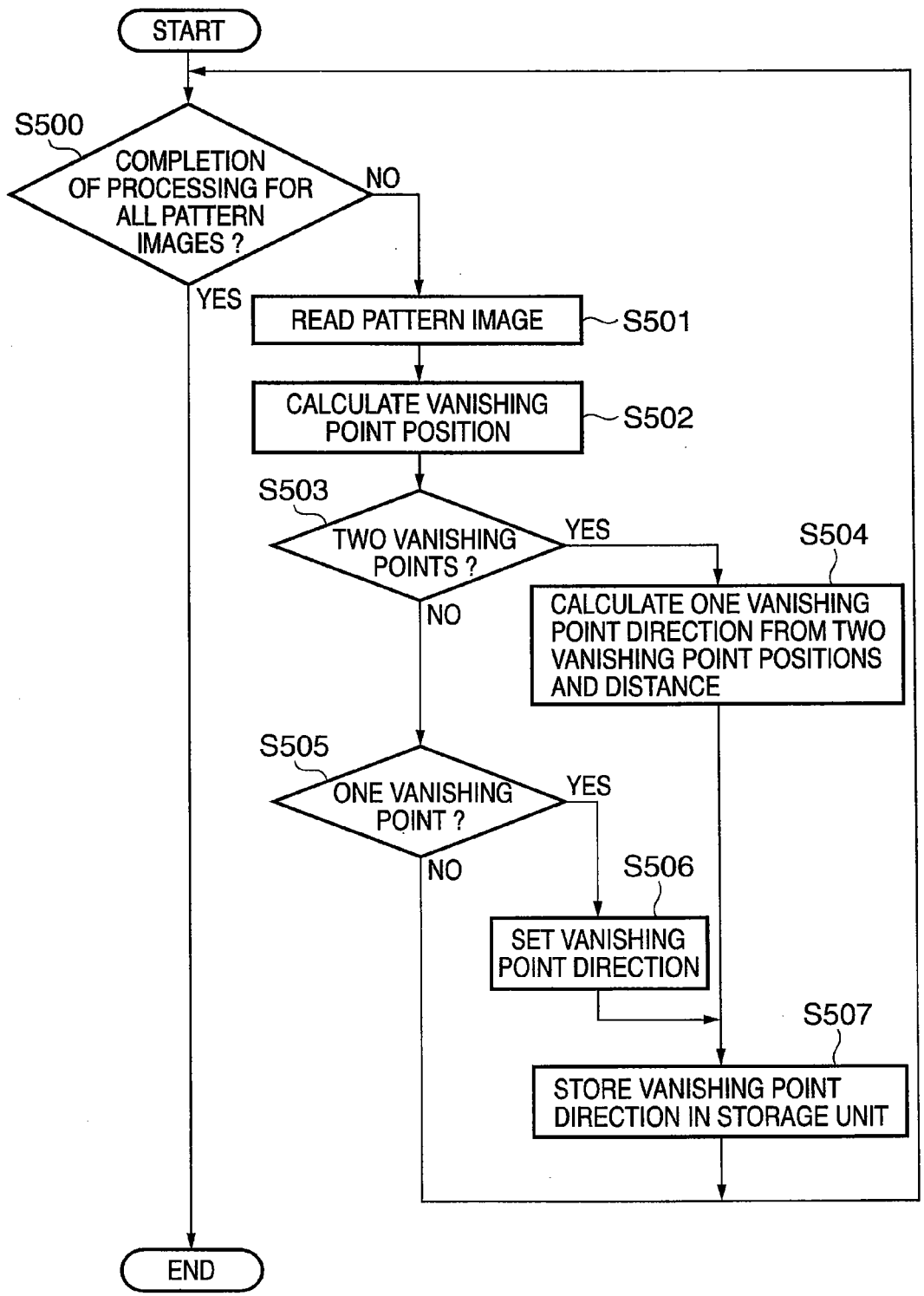
FIG. 5 is a flowchart showing details of the processing sequence of data analysis according to the first embodiment.

FIG. 5 is a flowchart showing details of the processing in step S405 in FIG. 4. The processing in FIG. 5 will be described below with reference to FIG. 7.

Figure 7:
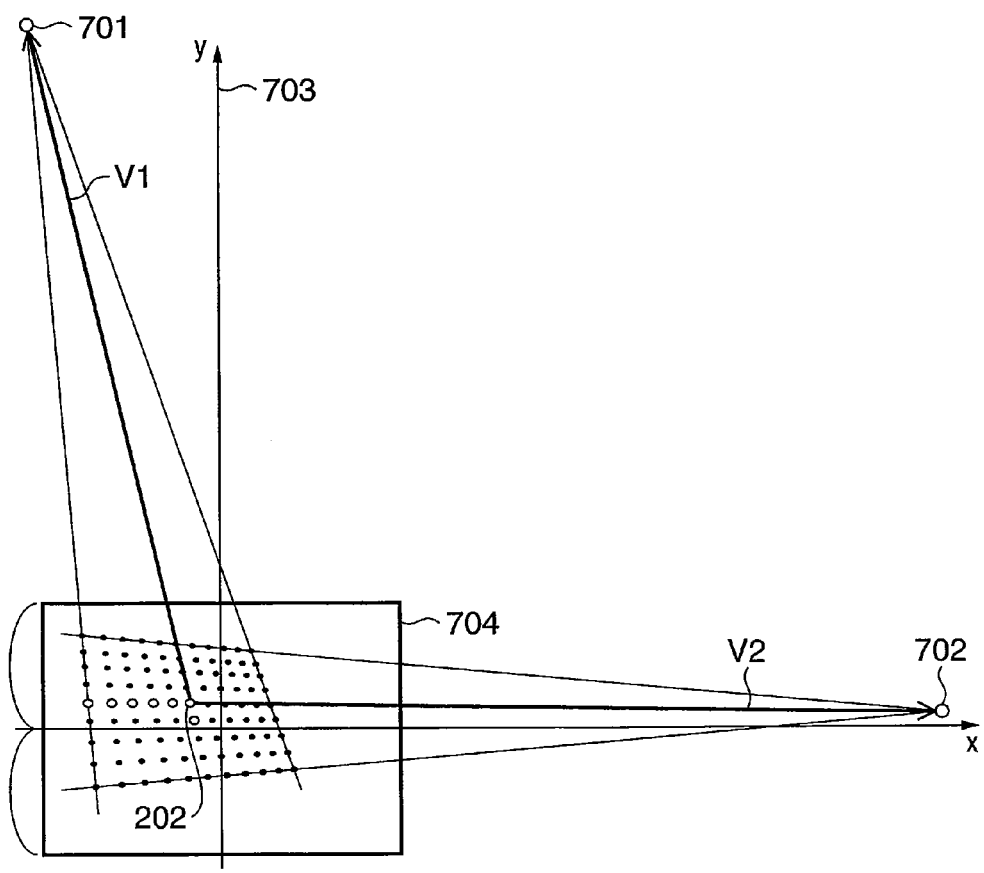
FIG. 7 illustrates two vanishing points of the captured calibration pattern according to the second embodiment.

It is checked with reference to the pattern images saved in the storage unit 107 in step S500 if processing is completed for all pattern images. The pattern image of interest is loaded in step S501. In step S502, vanishing point positions on an image coordinate system 703 are calculated using the loaded pattern image. The vanishing point positions are calculated as follows. Initially, points in a grid pattern on the calibration pattern 201 which appears on the pattern image are connected with straight lines in the vertical and horizontal directions on the 2D plane on the pattern. A point where the plurality of lines in the vertical direction intersect is defined as one vanishing point position, and a point where the plurality of lines in the horizontal direction intersect is defined as another vanishing point position. In FIG. 7, only lines at the two ends in each of the vertical and horizontal directions and vanishing points 701 and 702 as the intersections of these lines are illustrated and not all the lines used to calculate the vanishing points are illustrated for the illustrative convenience.

It is checked in step S503 if two vanishing points are calculated in step S502. If the two vanishing points are not calculated (lines in at least one of the vertical and horizontal directions become parallel to each other and an intersection cannot be calculated), the process advances to step S505. On the other hand, if the two vanishing points are calculated, the process advances to step S504.

In step S504, vectors V1 and V2 from the central point 202 on a pattern image 704 obtained by capturing the image of the calibration pattern 201 to the vanishing points 701 and 702 are calculated. Furthermore, a vanishing point direction D on this pattern image is determined by:

$$S = V1/|V1| + V2/|V2|$$

$$D = S/|S| \quad (5)$$

After that, the process advances to step S507 to store the vanishing point direction D in the storage unit 107 in association with the pattern image, and the process returns to step S500.

On the other hand, if it is determined in step S505 that one vanishing point is calculated, the process advances to step S506; otherwise, the process returns to step S500.

In step S506, a unit vector direction from the 2D coordinate value (to be referred to as a vector C hereinafter) of the central point 202 of the calibration pattern on the pattern image 704 to that (to be referred to as a vector V hereinafter) of the vanishing point is set as the vanishing point direction D:

$$D = V - C/|V - C| \quad (6)$$

In step S507, the calculated vanishing point direction D is stored in the storage unit 107 in correspondence with the pattern image, and the process returns to step S500.

In this way, if the vanishing point direction D is calculated for each pattern image, and the processing is complete for all the pattern images, the process advances to step S406 in FIG. 4.

Figure 6:
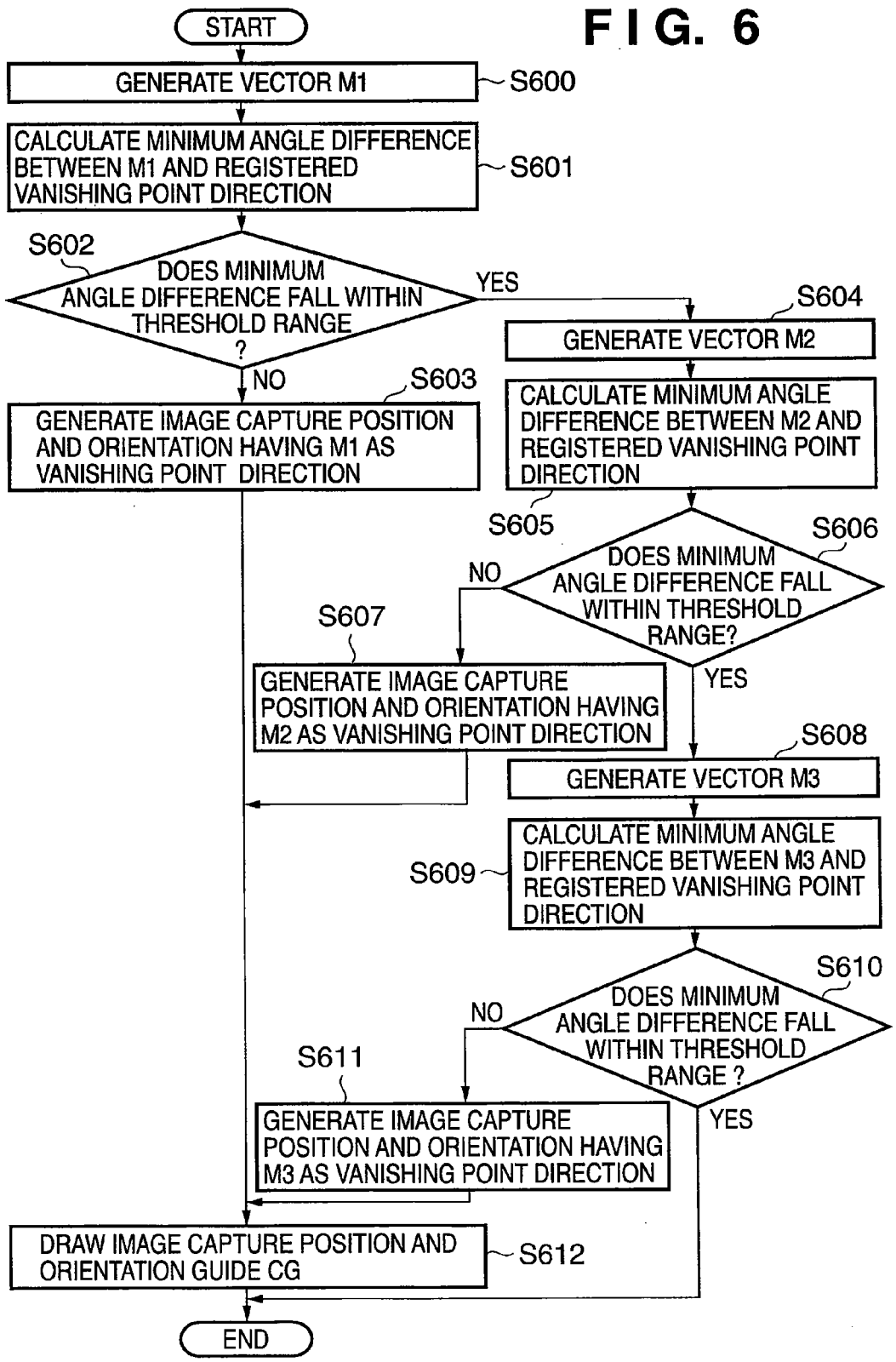
FIG. 6 is a flowchart showing details of the processing sequence of image capture position and orientation designations according to the second embodiment.

FIG. 6 is a flowchart showing details of the processing in step S406 in FIG. 4. The processing sequence in FIG. 6 will be described below with reference to FIGS. 8 and 9. Of the plurality of vanishing point directions calculated in step S405 in FIG. 4, the vanishing point direction calculated based on the first captured pattern image is defined as D1, and the remaining vanishing point directions are defined as D2 and D3 in the image capture order.

Figure 8:
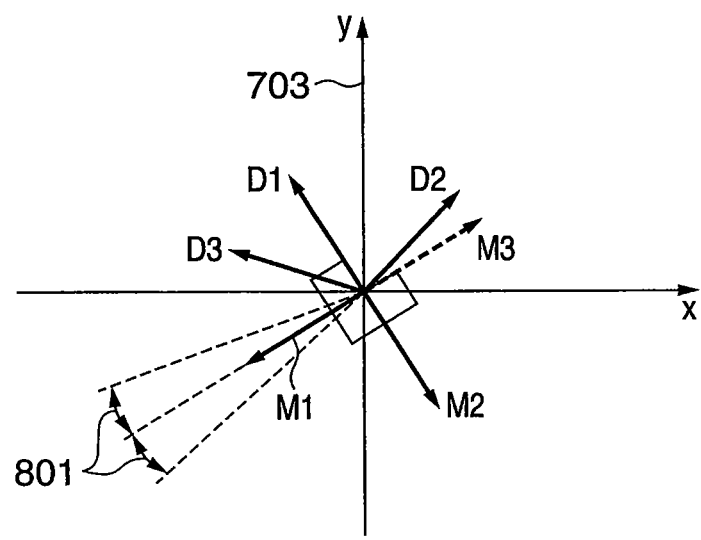
FIG. 8 is a graph showing the angles of respective vanishing point directions used to determine the designation position and orientation according to the second embodiment.

In step S600, a vector M1 is generated by rotating the vanishing point direction D1 through 90° about the origin of the image coordinate system. In step S601, the angle differences between the vector M1 and the vanishing point directions (D2 and D3 in FIG. 8) other than D1 are calculated to obtain a minimum angle difference. It is checked in step S602 if the minimum angle difference between M1 and the vanishing point direction is equal to or smaller than a threshold (an angle 801 in FIG. 8). If the minimum angle difference between M1 and the vanishing point direction is equal to or smaller than the threshold, the process advances to step S604; otherwise, the process advances to step S603. In FIG. 8, an angle M1 makes with D3 corresponds to the minimum angle difference. However, since the minimum angle difference at this time is larger than the threshold 801, the process advances to step S603. Note that the user himself or herself may input the threshold 801 according to the operation of the system, or a system operator other than the user may set it.

In step S603, the image capture position and orientation having M1 as the vanishing point direction are calculated and defined as the designation position and orientation. Details of this step will be described later.

In step S604, a vector M2 is generated by further rotating M1 through 90° about the origin of the image coordinate system. In step S605, the angle differences between M2 and the vanishing point directions other than D1 are calculated to obtain a minimum angle difference. Details of this step will be described later. It is checked in step S606 if the minimum angle difference between M2 and the vanishing point direction is equal to or smaller than the threshold (the angle 801 in FIG. 8). If the minimum angle difference is equal to or larger than the threshold 801, the image capture position and orientation having M2 as the vanishing point direction are calculated and defined as the designation position and orientation in step S607. On the other hand, if the minimum angle difference is equal to or smaller than the threshold 801, the process advances to step S608 to generate a vector M3 by further rotating M2 through 90°. Likewise, the angle differences between M3 and vanishing point directions other than D1 are calculated in step S609 to obtain a minimum angle difference.

If it is determined in step S610 that the minimum angle difference is larger than the threshold 801, the position and orientation of the image capturing unit 101 having M3 as the vanishing point direction are calculated and defined as the designation position and orientation (step S611). Details will be described later.

If it is determined in step S610 that the minimum angle difference is equal to or smaller than the threshold 801, the processing ends. For example, when M3 and D2 are obtained, as shown in FIG. 8, the angle that they make becomes the minimum angle difference. However, since this minimum angle difference is equal to or smaller than the threshold 801, it is determined that an image pattern corresponding to M3 is already stored in the storage unit 107, and the processing ends.

In step S612, a 3D guide CG that makes the user to capture an image of the pattern is drawn based on the designation position and orientation calculated in one of steps S603, S607, and S611. With the method described in the second embodiment, since the next image capture position and orientation of the image capturing device can be calculated, the designation position and orientation can be presented to the user as the 3D guide CG.

Note that the gist of the present invention is to present the next image capture position and orientation of the image capturing device to the user as the 3D guide CG. Hence, the next image capture position and orientation may be calculated by arbitrary methods, and the above example is merely an example of such methods. Therefore, the next image capture position and orientation may be calculated by methods other than that described above.

In step S603 (S607 or S611), the image capture position and orientation having M1 (M2 or M3) as the vanishing point direction are calculated as follows.

Initially, an image capture position and orientation Tr1, where the captured image having D1 as the vanishing point direction is acquired, are rotated about a viewpoint 900 of the image coordinate system 703, so that a pattern center C (central point 202) matches the origin O of the image coordinate system 703 (see FIG. 9). Note that the image capture position and orientation Tr1 correspond to a 4×4 matrix indicating the position and orientation on the world coordinate system, and are those upon image capture which are stored in the storage unit 107. Then, the rotated position and orientation are rotated through −90° about a direction which is perpendicular to the x-y plane and passes through the image center (the z-axis direction of the image coordinate system 703, the viewpoint direction is positive) as an axis, thereby obtaining an image capture position and orientation R1 (a 4×4 matrix indicating the position and orientation R1 on the world coordinate system). The image capture position and orientation are calculated by:

$$R1 = Tr1 \cdot \begin{bmatrix} n_x^2(1-\cos g) + \cos g & n_x n_y(1-\cos g) - n_z \sin g & n_x n_z(1-\cos g) + n_y \sin g & 0 \\ n_x n_y(1-\cos g) + n_z \sin g & n_y^2(1-\cos g) + \cos g & n_y n_z(1-\cos g) - n_x \sin g & 0 \\ n_x n_z(1-\cos g) - n_y \sin g & n_y n_z(1-\cos g) + n_x \sin g & n_z^2(1-\cos g) + \cos g & 0 \\ 0 & 0 & 0 & 1 \end{bmatrix} \cdot \begin{bmatrix} \cos\left(-\frac{\pi}{2}\right) & -\sin\left(-\frac{\pi}{2}\right) & 0 & 0 \\ \sin\left(-\frac{\pi}{2}\right) & \cos\left(-\frac{\pi}{2}\right) & 0 & 0 \\ 0 & 0 & 1 & 0 \\ 0 & 0 & 0 & 1 \end{bmatrix} \quad (7)$$

where $n(n_x, n_y, n_z)$ is a rotation axis vector upon rotating the image coordinate value C of the central point 202 on the camera coordinate system to the origin on the image coordinate system, and g is the rotation angle at that time. The image capture position and orientation calculated in this way are stored in the storage unit 107. The image capture position and orientation having M2 or M3 as the vanishing point direction are similarly calculated as M1. At this time, in case of M2, R1 is calculated by:

$$R1 = Tr1 \cdot \begin{bmatrix} n_x^2(1-\cos g) + \cos g & n_x n_y(1-\cos g) - n_z \sin g & n_x n_z(1-\cos g) + n_y \sin g & 0 \\ n_x n_y(1-\cos g) + n_z \sin g & n_y^2(1-\cos g) + \cos g & n_y n_z(1-\cos g) - n_x \sin g & 0 \\ n_x n_z(1-\cos g) - n_y \sin g & n_y n_z(1-\cos g) + n_x \sin g & n_z^2(1-\cos g) + \cos g & 0 \\ 0 & 0 & 0 & 1 \end{bmatrix} \cdot \begin{bmatrix} \cos(-\pi) & -\sin(-\pi) & 0 & 0 \\ \sin(-\pi) & \cos(-\pi) & 0 & 0 \\ 0 & 0 & 1 & 0 \\ 0 & 0 & 0 & 1 \end{bmatrix} \quad (8)$$

Also, in case of M3, R1 is calculated by:

$$R1 = Tr1 \cdot \begin{bmatrix} n_x^2(1-\cos g) + \cos g & n_x n_y(1-\cos g) - n_z \sin g & n_x n_z(1-\cos g) + n_y \sin g & 0 \\ n_x n_y(1-\cos g) + n_z \sin g & n_y^2(1-\cos g) + \cos g & n_y n_z(1-\cos g) - n_x \sin g & 0 \\ n_x n_z(1-\cos g) - n_y \sin g & n_y n_z(1-\cos g) + n_x \sin g & n_z^2(1-\cos g) + \cos g & 0 \\ 0 & 0 & 0 & 1 \end{bmatrix} \cdot \begin{bmatrix} \cos\left(-\frac{3\pi}{2}\right) & -\sin\left(-\frac{3\pi}{2}\right) & 0 & 0 \\ \sin\left(-\frac{3\pi}{2}\right) & \cos\left(-\frac{3\pi}{2}\right) & 0 & 0 \\ 0 & 0 & 1 & 0 \\ 0 & 0 & 0 & 1 \end{bmatrix} \quad (9)$$

[Third Embodiment]

In the first embodiment, the image capture position and orientation are designated only after the initial camera parameters of the image capturing unit 101 are derived in step S403 in FIG. 4. However, the present invention is not limited to the calibration method and calibration order of derivation of the initial camera parameters and the like. For example, when the camera calibration has already been done using an image capturing device of the same model, and rough calibration values are stored, values close to the intrinsic parameters of the image capturing unit 101 to be used are calculated in advance. In this case, when the calibration pattern can be recognized, the camera extrinsic parameters may be derived without deriving the initial camera parameters. In this way, details of the processing sequence for calibrating the final camera intrinsic parameters based on the rough camera internal parameters acquired in advance will be described with reference to the flowchart of FIG. 11.

Figure 11:
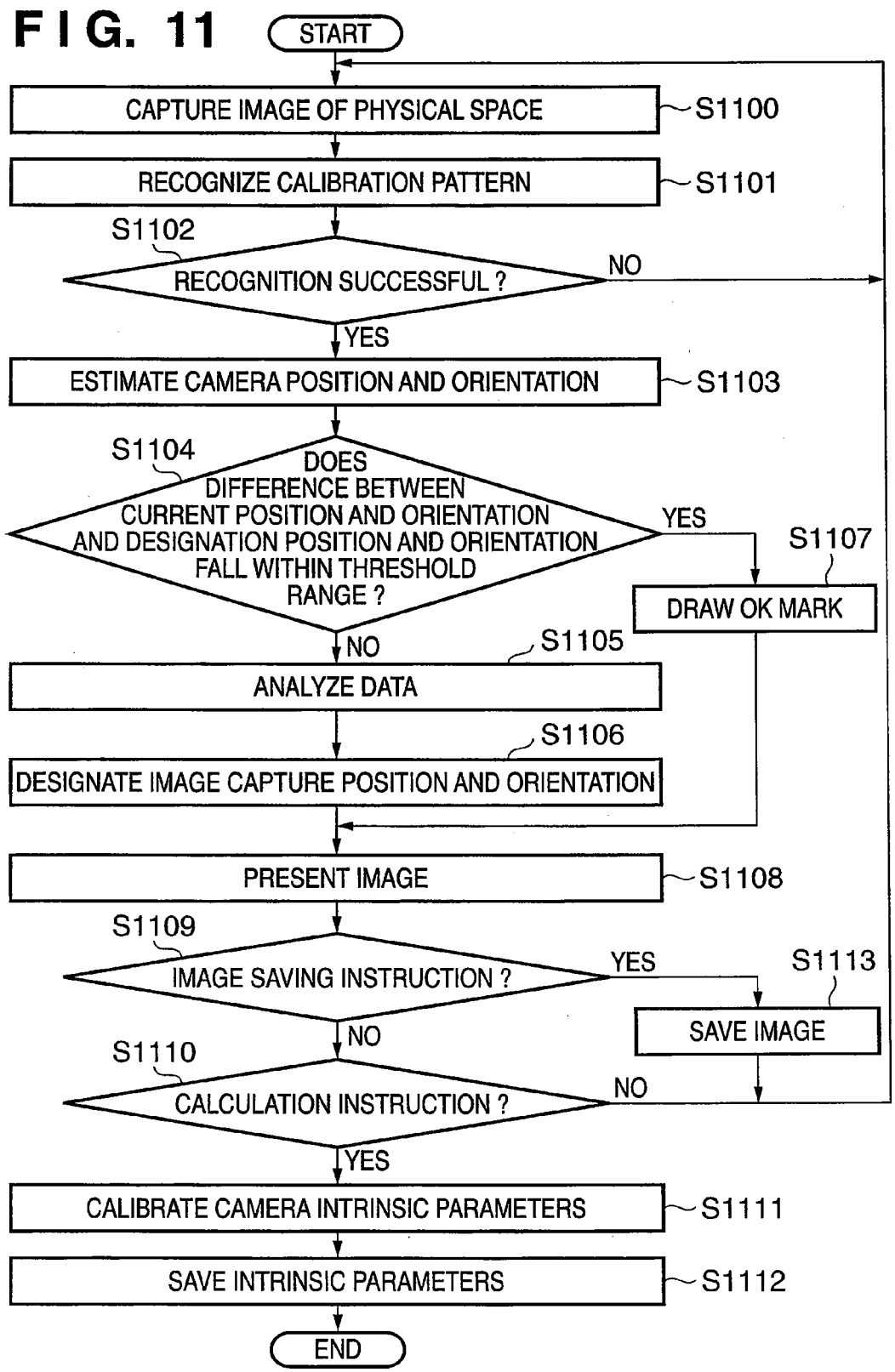
FIG. 11 is a flowchart showing details of the processing sequence of the third embodiment.

FIG. 11 is a flowchart showing the brief processing sequence of the image capture environment calibration method according to the third embodiment. A main difference between the processing shown in FIG. 11 and the flowchart in FIG. 4 is that the branch in step S403 is excluded, and the camera position and orientation estimation processing in step S1103 is added instead.

In step S1103, the camera extrinsic parameters are derived from the image of the calibration pattern 201 with reference to the rough camera intrinsic parameter values stored in advance in the storage unit 107. Other processes (steps S1100 to S1102 and S1104 to S1113) are the same as those in the flowchart of FIG. 4 (S400 to S402 and S404 to S413), and a repetitive description thereof will be avoided.

[Fourth Embodiment]

In the first embodiment, 3D guide CGs used to designate the positions and orientations of the image capturing unit are displayed and designated for the user in the camera calibration. However, application of the present invention is not limited to the execution of the camera calibration. For example, the present invention can also be applied to the processing for capturing an image of a pattern or marker allocated on the physical space using the image capturing unit 101, and calculating and calibrating the positions and orientations of objects, the distances between the objects, and the like from that image. The fourth embodiment will exemplify a case wherein the present invention is applied to the calibration processing of the position and orientation of a marker allocated on the physical space. This embodiment will explain an example when an HMD is used as a presentation device of the designated position and orientation.

Figure 12:
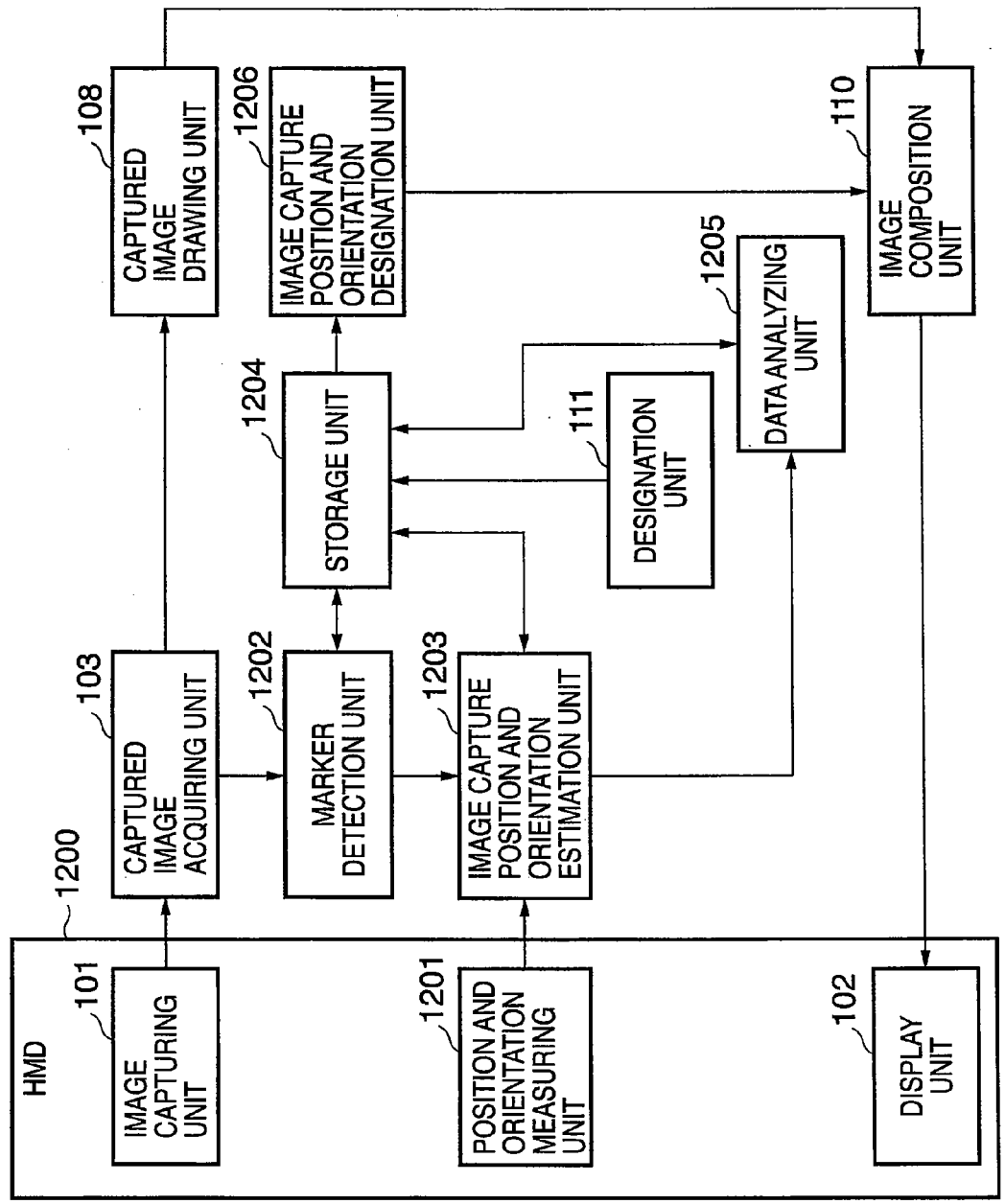
FIG. 12 is a block diagram showing the functional arrangement of the fourth embodiment.

FIG. 12 is a block diagram showing the functional arrangement in the second embodiment. Note that the same reference numerals in FIG. 12 denote components having the same functions as in FIG. 1.

Reference numeral 1200 denotes an HMD which has the image capturing unit 101 and display unit 102. The image capturing unit 101 and display unit 102 are fixed to the HMD 1200 main body. In the fourth embodiment, the HMD 1200 comprises two image capturing units 101 and two display units 102, and stereoscopic images of the physical space can be captured and displayed. The user can watch the stereoscopic image displayed on the display unit 102 when he or she wears the HMD 1200 on the head. The HMD of such mode is described in, e.g., A. Takagi, S. Yamazaki, Y. Saito, and N. Taniguchi: "Development of a stereo video see-through HMD for AR systems", ISAR2000, pp. 68-77, 2000 (to be referred to as "reference Takagi et al." hereinafter).

The HMD 1200 is also used to superimpose a 3D guide CG having a shape of the HMD on the image of the physical space so as to designate the image capture position and orientation for the user. In the following description, assume that "image capturing unit 101" and "display unit 102" simultaneously express the right and left image capturing units and right and left display units. The present invention is not limited to capturing and displaying of stereoscopic images. The present invention can be applied to at least one set of the image capturing unit and display unit, as can be seen from the following description. Furthermore, the present invention is not limited to the use of the HMD 1200. The present invention can be applied to a case in which the user holds the image capturing unit 101, and can observe the image displayed on the display unit 102 allocated at another place, as can be seen from the following description.

The image capturing unit 101 includes color CCD cameras fixed to the HMD 1200. The present invention does not have any limitations on the types of image capturing unit 101, as long as they can capture an image of the physical space so that the user can recognize the physical space upon observing that image.

The display unit 102 includes LCD displays fixed to the HMD 1200. Images displayed on the LCD displays are presented to the user via free-form-surface prisms. Of course, the present invention is not limited to such specific display device and can be applied to any other display devices as long as the user can confirm the designation position and orientation using the physical space image.

A position and orientation measuring unit 1201 measures the position and orientation of the image capturing unit 101 attached to the HMD 1200. In the fourth embodiment, FASTRAK available from Polhemus as a magnetic sensor is used as the position and orientation measuring unit 1201. This FASTRAK receives a magnetic field transmitted by a transmitter (not shown) using a receiver (the unit 1201 in FIG. 13), thereby outputting the position and orientation of the image capturing unit 101. Of course, the present invention is not limited to such specific magnetic sensor. For example, the present invention can be applied to any other methods such as an optical sensor, a method of calculating the position and orientation of the image capturing unit 101 from a marker, and the like as long as the position and orientation of the image capturing unit 101 can be calculated.

A marker detection unit 1202 receives a captured image from the captured image acquiring unit 103. Furthermore, the unit 1202 loads marker data which are saved in advance in a storage unit 1204, as shown in FIG. 21, and detects rectangular markers 1301 to 1304 shown in FIG. 13. Details of this processing will be described later.

An image capture position and orientation estimation unit 1203 estimates the current position and orientation of the image capturing unit 101 using the measurement value of the position and orientation measuring unit 1201. The storage unit 1204 holds information required for the processing of the image capture environment calibration method in the fourth embodiment, and executes read and write processes according to the processing. Note that the information required for the processing of the image capture environment calibration method in the fourth embodiment includes, for example:

marker data, pattern images in the markers, and marker positions and orientations after calibration;

saved captured images;

vertex information (3D positions defined on a reference coordinate system, information required to draw the virtual object including connection information of vertices, material settings of the object, and the like) of a virtual object (the geometric model of the HMD, a guide CG) to be drawn for the purpose of the position and orientation presentation;

the 2D positions of the markers from the captured image, a designation position and orientation sequence that stores the designation positions and orientations of the image capturing unit, and setting upon pressing of mouse buttons (pressing of the left button: image saving, and pressing of the right button: start of the marker calibration);

the camera intrinsic parameters, and so forth.

A data analyzing unit 1205 calculates the image capture position and orientation to capture a marker image required to precisely estimate the marker position and orientation with reference to the marker data stored in the storage unit 1204. Details of the processing will be described later. An image capture position and orientation designation unit 1206 draws a 3D guide CG based on the designation position and orientation stored in the storage unit 1204.

Figure 13:
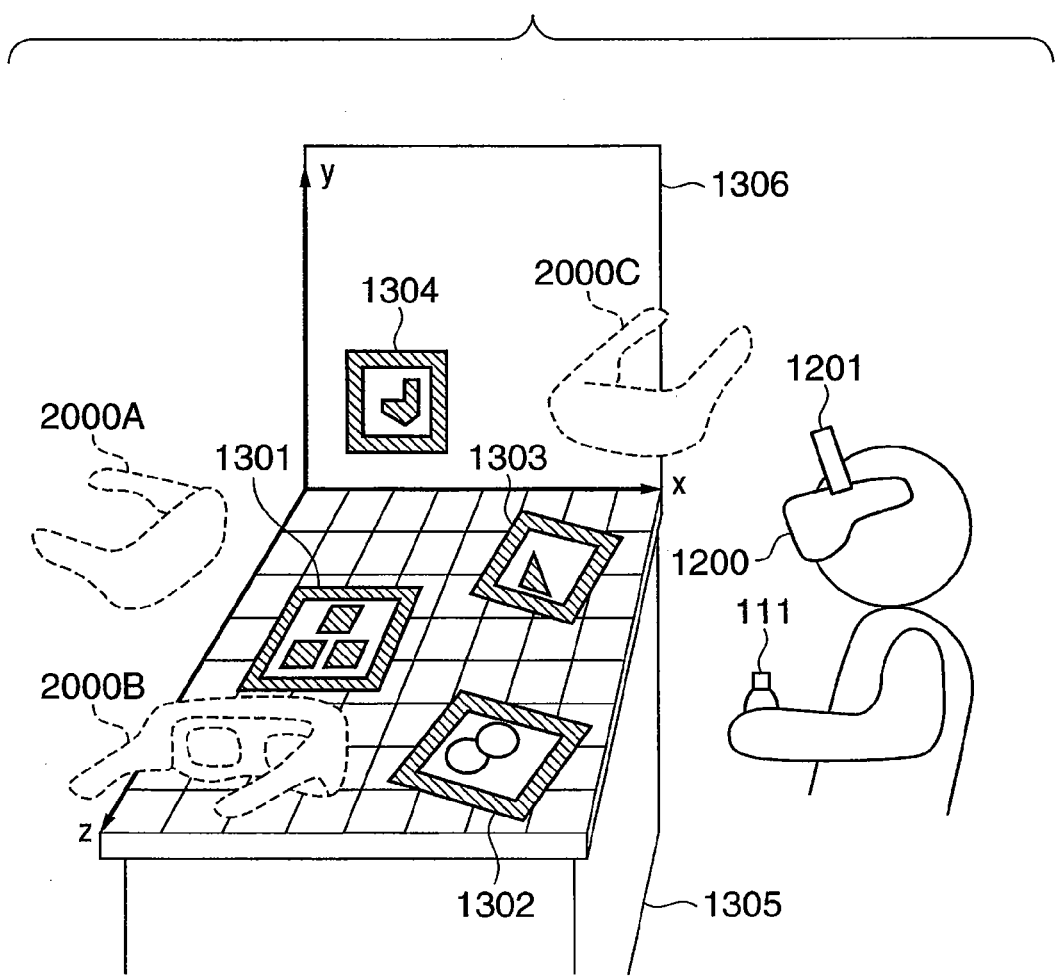
FIG. 13 is a view illustrating the use state of an image capture environment calibration method according to the fourth embodiment.

FIG. 13 is a view illustrating the use state of the image capture environment calibration method according to the fourth embodiment. Note that the same reference numerals in FIG. 13 denote the same components as in FIG. 12.

Referring to FIG. 13, 20 cm×20 cm square markers 1301 to 1304 are adhered on a table 1305 and wall surface 1306 allocated on the physical space. The user registers in advance rough positions and orientations of these square markers 1301 to 1304 in the format shown in FIG. 21 as marker data in the storage unit 1204. In the fourth embodiment, the position and orientation are calibrated based on a plurality of images obtained by capturing the square markers 1301 to 1304. The fourth embodiment uses, for example, a marker called "ARToolKit" as these square markers 1301 to 1304. As for information of ARToolKit, please refer to "H. Kato, M. Billinghurst, K. Asano, and K. Tachibana: "An Augmented Reality System and Its Calibration based on Marker Tracking", Transactions of the Virtual Reality Society of Japan, Vol. 4, No. 4, PP. 607-616, December 1999 (to be referred to as "reference Kato et al." hereinafter)". In FIG. 13, reference numerals 2000A to 2000C denote some of 3D guide CGs (HMD objects in this embodiment). The fourth embodiment automatically predicts a pattern image required upon the marker calibration, and presents a 3D guide CG indicating a position where that pattern image can be captured to the user. Note that the fourth embodiment displays the HMD objects 2000A to 2000C to have real scales on the physical space.

The processing sequence in the image capture environment calibration method configured by the block diagram shown in FIG. 12 will be described below with reference to the flowchart of FIG. 14.

In step S1400, the captured image acquiring unit 103 receives an image signal captured by the image capturing unit 101 and converts it into image data. In step S1401, the markers are detected and the positions and orientations of the markers on the camera coordinate system are calculated using the method described in reference Kato et al. In case of reference Kato et al., in order to detect the markers, binarization processing is executed, line fitting is executed for each white label region, and a region that can be sufficiently approximated by four line segments is determined as a marker candidate. A pattern image inside the marker candidate region is normalized, and the normalized pattern image undergoes template matching with a pattern image in the storage unit 1204, which is described in a PATTERN field of the marker data shown in FIG. 21, thus identifying the marker.

In step S1402, the position and orientation output from the position and orientation measuring unit 1201 are set as those of the image capturing unit 101 intact. However, the present invention is not limited to the direct use of the output values of the position and orientation measuring unit 1201. For example, when the markers are identified, the position and orientation of the image capturing unit 101 may be calculated; when the markers are not identified, the position and orientation of the image capturing unit 101 may be calculated from the outputs of the position and orientation measuring unit 1201. Hence, the methods which are switched case by case may be used.

It is confirmed in step S1403 if data analysis of the designation position and orientation sequence in step S1404 is complete. If the data analysis is complete, the process jumps to step S1405; otherwise, the process advances to step S1404.

In step S1404, an image capture position and orientation where the user can capture an image including a given reference marker and two markers other than that reference marker are calculated with reference to the marker data (FIG. 21) stored in the storage unit 1204. In the fourth embodiment, the following three designation positions and orientations of the image capturing unit 101 are calculated using the marker 1301 as a reference marker:

(1) an image capture position where the user can capture an image including the marker 1301 and markers 1302 and 1303;

(2) an image capture position where the user can capture an image including the marker 1301 and markers 1303 and 1304; and (3) an image capture position where the user can capture an image including the marker 1301 and markers 1302 and 1304.

In order to calculate these designation positions and orientations, the average position obtained by averaging the 3D positions of the three markers described in the marker data in FIG. 21, and a normal vector to a plane including three points of the 3D positions of the three markers are calculated. Next, let L be a length corresponding to a maximum distance between two out of the three points. Furthermore, the designation position and orientation are set on a line in the direction of the normal vector, which passes through a point of the average position, in a direction pointed by the normal vector and at a position $L+30/\tan \theta$. Note that $\theta$ is the field angle calculated from the intrinsic parameters of the image capturing unit 101. Moreover, an axis of sighting vector of the image capturing unit 101 at the designation position and orientation is set in a direction opposite to the normal vector. At this time, an up vector indicating the upper direction of the image capturing unit 101 may be set to have a direction perpendicular to a line segment corresponding to a maximum distance between two out of the three points, although it may be set arbitrarily.

When all the three markers are located on an identical plane, since the user captures an image of the markers from a position normal to all the markers, the marker detection precision drops. In order to avoid such situation, when the normal vectors (calculated from the orientations of the markers) of the three markers are equal to each other, the designation position and orientation are rotated through +20° about a vector perpendicular to the normal direction. Such processing is applied to the three combinations of the markers, and the three sets of the positions and orientations of the image capturing unit 101 are stored in the designation position and orientation sequence in the storage unit 1204 as the designation positions and orientations.

Note that the present invention does not depend on the aforementioned data analysis method, but may be applied to a method that can generate the designation position and orientation of the image capturing unit 101 where an appropriate marker image can be input upon the marker calibration.

In step S1405, 3D guide CGs used to teach the user the designation positions and orientations are drawn based on those calculated in step S1404. Detailed processing will be described later.

It is checked in step S1406 if an event to instruct image saving (pressing of the left button of the hand-held mouse) is generated by the designation unit 111 held by the user. If it is determined that the image saving instruction event is generated, the process advances to step S1407. If no image saving instruction event is generated, the process advances to step S1408.

In step S1407, the captured image including the markers is saved in the storage unit 1204. Upon completion of this processing, the process returns to step S1400. It is checked in step S1408 if an event to instruct to start the calibration of the marker position and orientation (pressing of the right button of the hand-held mouse) is generated by the designation unit 111 held by the user. If it is determined that the calibration start instruction event is generated, the process advances to step S1409. If no calibration start instruction event is generated, the process returns to step S1400.

In step S1409, the position and orientation of each marker are calibrated by the method described in reference Baratoff et al. In the method of reference Baratoff et al., relative positions and orientations of respective markers included in a plurality of captured images are calculated with respect to the captured images including the markers. Next, the relative positions and orientations calculated for respective images are converted into the positions and orientations to have the reference marker 1301 as the center. Finally, the positions and orientations of all the markers on the reference coordinate system are calculated from the position and orientation of the reference marker 1301 on the reference coordinate system, which are described in the marker data of the reference marker 1301. In step S1410, the positions and orientations of the markers calibrated in step S1409 are stored in the storage unit 1204.

Figure 14:
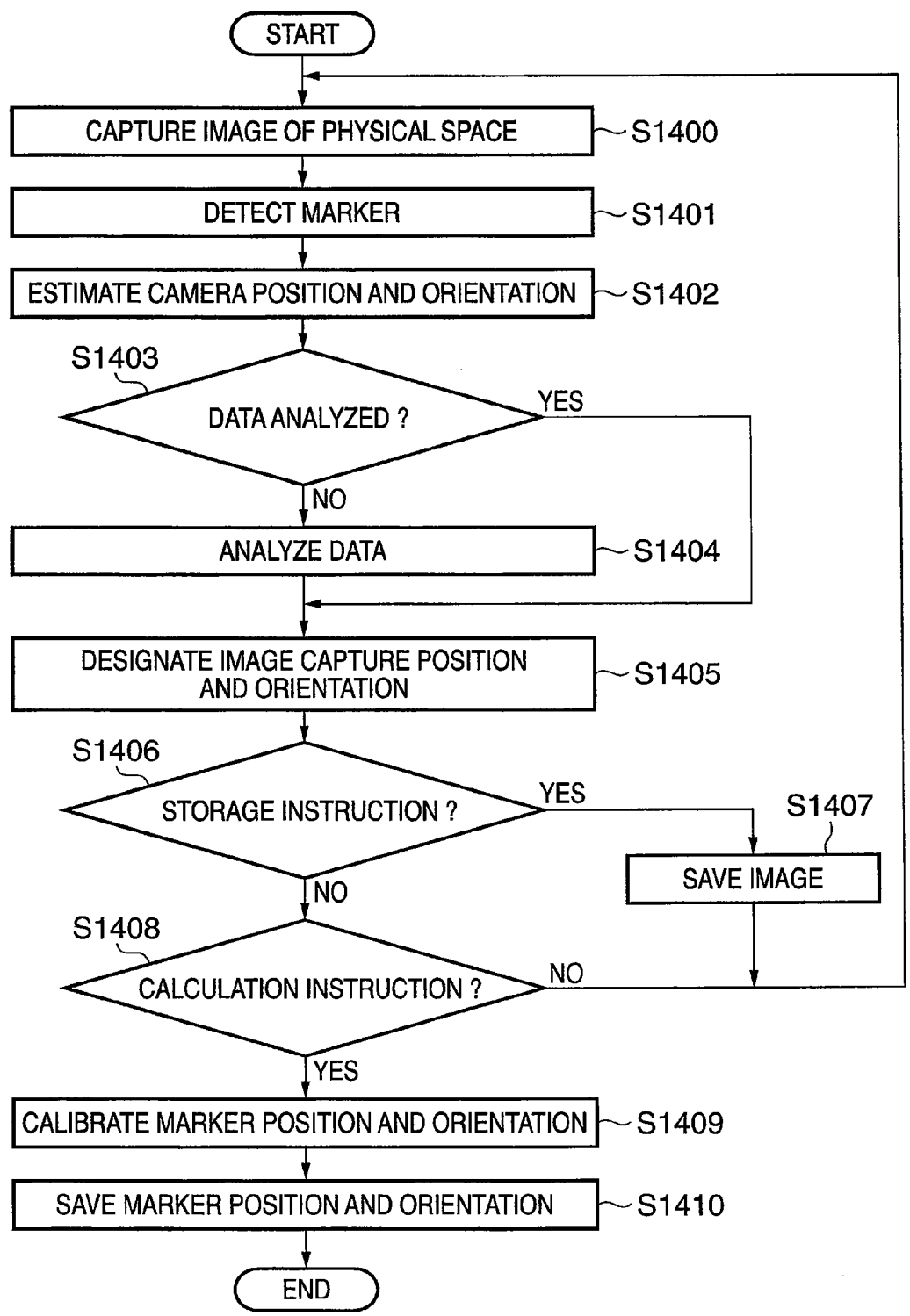
FIG. 14 is a flowchart showing a brief processing sequence of the image capture environment calibration method according to the fourth embodiment.
Figure 15:
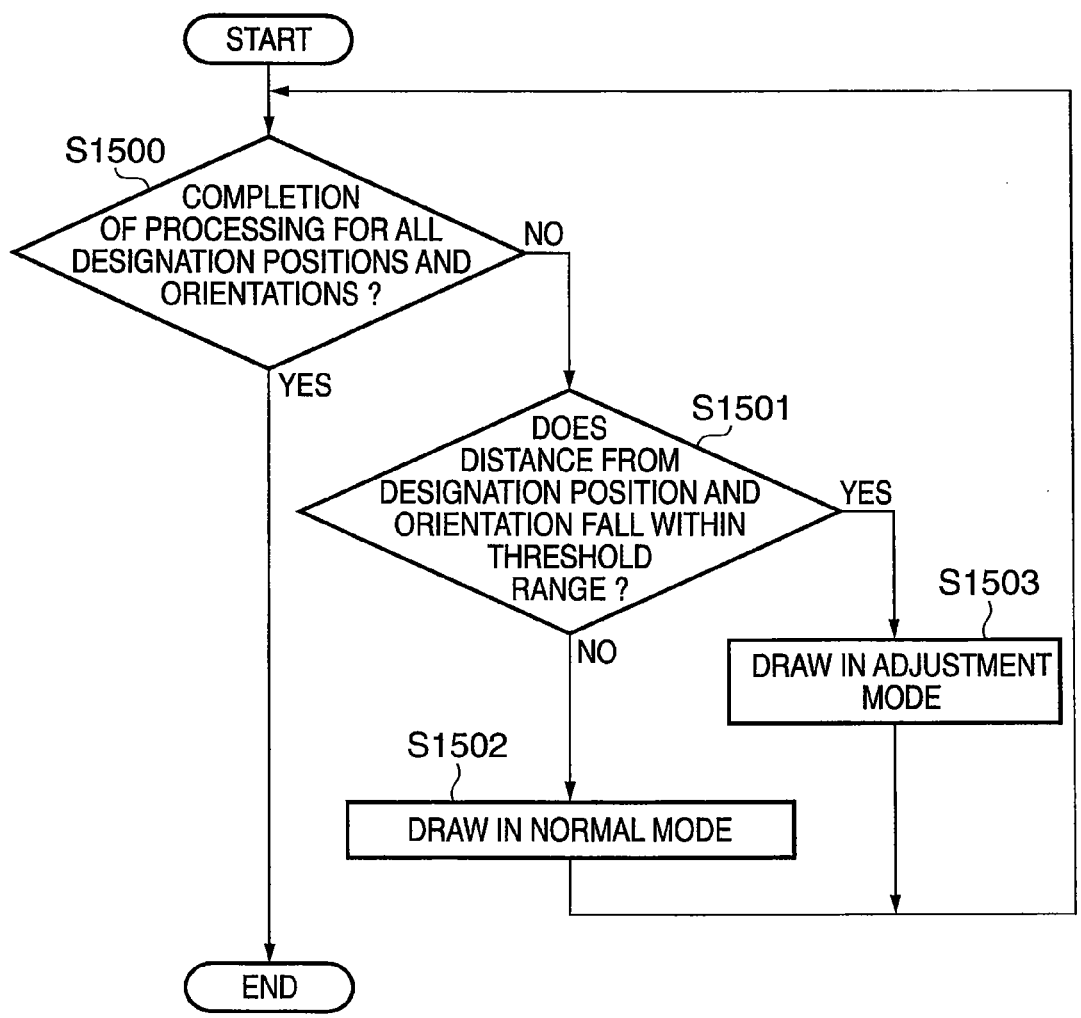
FIG. 15 is a flowchart showing details of the processing sequence of image capture position and orientation designations according to the fourth embodiment.

FIG. 15 is a flowchart showing details of the processing sequence in step S1405 in FIG. 14. The processing in FIG. 15 will be described below with reference to FIGS. 16 to 18.

It is confirmed in step S1500 if the drawing processing is complete for all the designation positions and orientations stored in the designation position and orientation sequence. If the drawing processing to be executed still remains, the process advances to step S1501. On the other hand, if the drawing processing is complete for all the positions and orientations, this processing ends.

In step S1501, the designation position and orientation to be currently processed in the storage unit 1204 are compared with the current image capture position and orientation to check if their difference is larger than a threshold. If the difference is larger than the threshold, the process advances to step S1502; otherwise, the process advances to step S1503. Note that the threshold in this processing may be input by the user according to the operation of the system, or may be set by a system operator other than the user.

Figure 16:
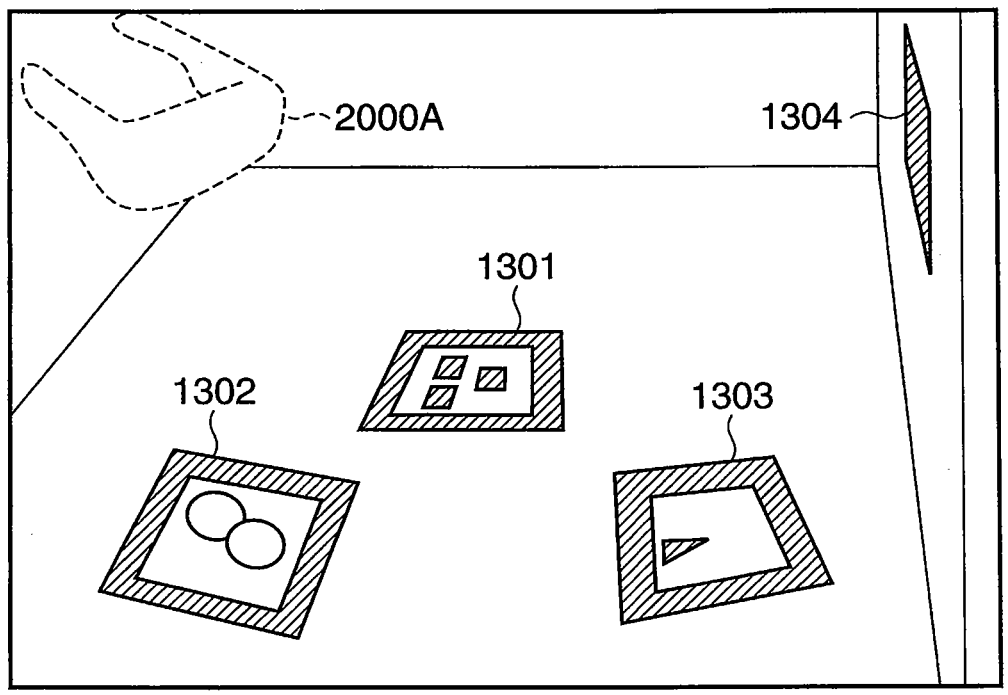
FIG. 16 is a view for explaining the display form in a normal mode in the processing of the image capture position and orientation designations according to the fourth embodiment.

In step S1502, a 3D guide CG based on the designation position and orientation is presented to the user in a mode called a normal mode. In the normal mode, the HMD object 2000A as a 3D guide CG having an HMD shape is allocated at the 3D position on the reference coordinate system defined by the designation position and orientation, and is superimposed on the captured image, as shown in FIG. 16. Upon completion of the drawing processing, the process returns to step S1500.

In step S1503, a 3D guide CG based on the designation position and orientation is presented to the user in a mode called an adjustment mode. In the normal mode, the 3D guide CG having the HMD shape is drawn to present a rough position and orientation of the designation position and orientation to the user. However, when the user himself or herself approaches the 3D guide CG drawn in the normal mode, almost of the visual field region is occluded by the 3D guide CG. For this reason, it becomes difficult for the user himself or herself to confirm and adjust marker images to be finally captured. Hence, when the position and orientation of the image capturing unit 101 approach the 3D guide CG having the HMD shape, the adjustment mode that draws a 3D guide CG that allows the user to adjust the position and orientation of the image capturing unit 101 while confirming marker images is used to solve the aforementioned problem.

Figure 17:
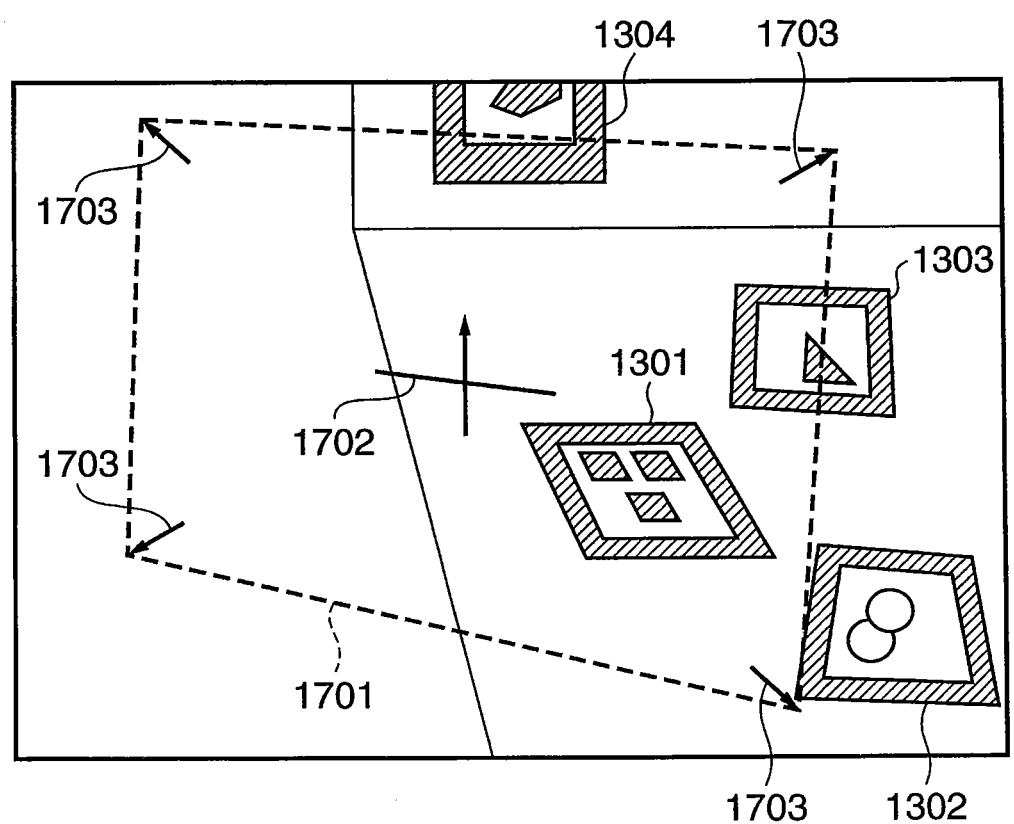
FIG. 17 is a view for explaining the display form in an adjustment mode in the processing of the image capture position and orientation designations according to the fourth embodiment.

In this embodiment, a 3D guide CG that makes the user imagine a projected plane of the image capturing unit 101 is drawn, as shown in FIG. 17. Note that reference numeral 1701 denotes an image capture frame, which is a rectangular frame indicating an image range to be captured by the image capturing unit 101. The user moves the image capturing unit 101 to fit the center of the image capturing unit 101 to a center display 1702 of the image capture frame 1701. Also, the user moves and rotates the image capturing unit 101 to fit the corners of the actual screen of the image capturing unit 101 to the distal ends of four arrows 1703, which indicate the corners of the image capture frame 1701. In this way, the user adjusts the image capture position and orientation to fit the designation position and orientation. Upon completion of the processing, the process returns to step S1500.

Figure 18:
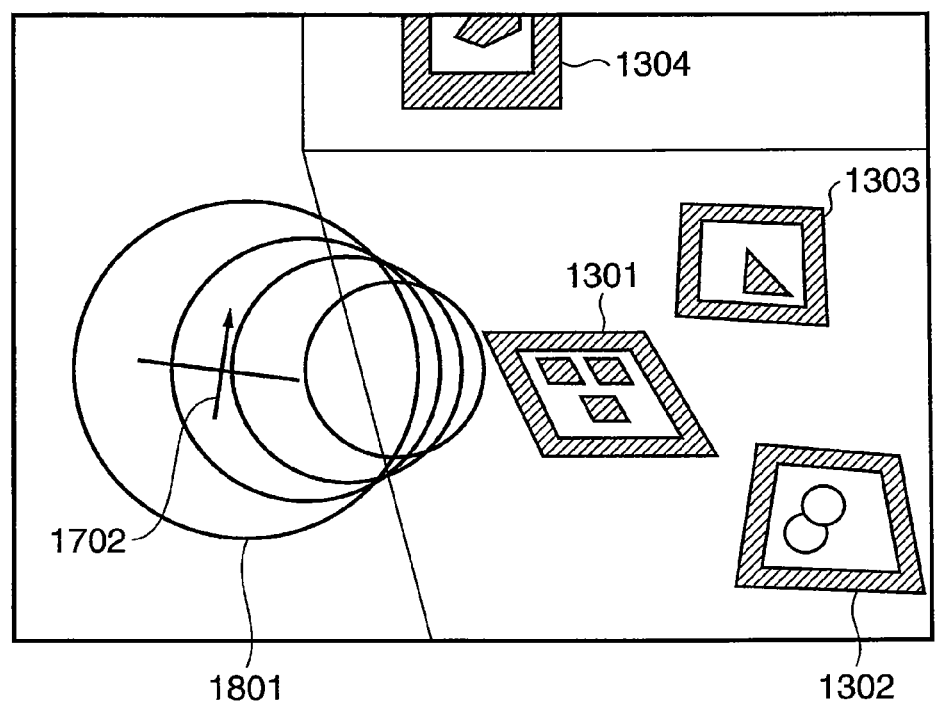
FIG. 18 is a view for explaining another display form in an adjustment mode in the processing of the image capture position and orientation designations according to the fourth embodiment.

Note that the drawing form in the adjustment mode is not limited to the 3D guide CG shown in FIG. 17. For example, a plurality of circular objects 1801 which have their centers on the axis of sighting of the image capturing unit 101 at the designation position and orientation, and whose diameters change along the axis of sighting are allocated at equal intervals along the axis of sighting and are drawn as a 3D guide CG, as shown in FIG. 18. Note that the plurality of circles 1801 may have the same diameter. According to such drawing, the user can adjust the image capture position and orientation by moving the image capturing unit 101 so that the center display 1702 of the designation position and orientation overlaps the centers of the respective circles. In this manner, any other methods can be applied as along as they allow the user himself or herself to precisely adjust the image capture position and orientation of the image capturing unit 101 to the designation position and orientation.

As described above, according to the fourth embodiment, the calibration apparatus automatically predicts a pattern image required upon calibration of the position and orientation of each marker, presents a position where that pattern image can be captured to the user, and guides the user to that position. For this reason, even a beginner who does not know the algorithm or mechanism of the calibration of the marker position and orientation can precisely execute calibration of the marker position and orientation.

[Fifth Embodiment]

In the fourth embodiment, a 3D guide CG is superimposed on the 3D space by exploiting mixed reality. However, the present invention is not limited to such specific 3D guide CG display method. For example, as shown in FIG. 19, HMD objects 2000A, 2000B, and 2000C (object 2000C is not shown) indicating the designation positions and orientations viewed from a viewpoint to look down at the space may be displayed within a partial frame 1900 on the image capture screen on a part of the captured image. At this time, within the frame 1900, virtual markers 1901 to 1904 corresponding to the overhead viewpoint, an HMD object 1905 indicating the current image capture position and orientation, and a coordinate axis object 1906 indicating a coordinate system are displayed. Upon displaying images from the overhead viewpoint within the frame 1900, it is preferable to display semitransparent objects within the frame 1900 so as to allow the user to visually confirm the markers in the captured image at the same time.

A main difference from the fourth embodiment will be described below.

The main difference from the fourth embodiment in the processing sequence according to the fifth embodiment is the processing in step S1405 of FIG. 14. In the processing in step S1405 in the fifth embodiment, the coordinate axis object 1906 indicating the coordinate system is allocated first. Next, the HMD objects 2000A, 2000B, and 2000C are allocated based on the designation positions and orientations stored in the designation position and orientation sequence. Then, the virtual markers 1901 to 1904 are allocated using the position and orientation data and pattern data acquired from the marker data. Furthermore, the HMD object 1905 at the current image capture position and orientation is allocated. Moreover, these pieces of allocated information are projected onto the projection plane (frame 1900) of the virtual camera at the overhead viewpoint, and the projected images are displayed as semitransparent images within the frame on the image capture screen. In place of the aforementioned overhead viewpoint, a top view, orthographic views, or the like may be displayed.

[Sixth Embodiment]

Figure 20:
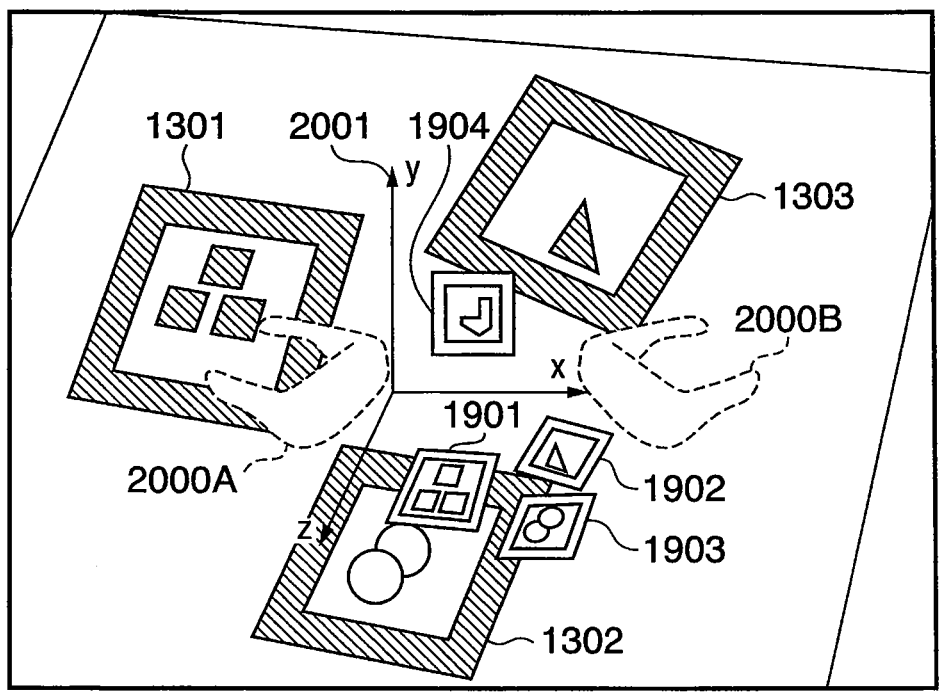
FIG. 20 illustrates an image to be presented to the user upon using an image capture environment calibration method according to the sixth embodiment.

In the fourth embodiment, the designation positions and orientations are displayed on the physical space to have real scales. However, the designation positions and orientations may be presented, as shown in FIG. 20. That is, the designation positions and orientations displayed to have real scales and a virtual object group including the virtual markers 1901 to 1904 which are drawn based on the current position and orientation of the image capturing unit 101 are displayed in a reduced scale, so as to prevent the designation positions and orientations to allow the user to look down at the overall space.

A main difference from the fifth embodiment will be described below.

A difference from the fifth embodiment in the processing sequence is the last display in step S1405. In the fifth embodiment, object images are projected onto the projection plane of the virtual camera at the overhead viewpoint. However, in the sixth embodiment, the virtual object group used in the fourth embodiment is downscaled to, e.g., ⅓ to have an origin (not shown) of the reference coordinate system as the center. A coordinate conversion matrix of downscaling for converting from this reference coordinate system to a coordinate system 2001 shown in FIG. 20 is calculated to reduce the virtual object group. Note that the scale value of each virtual object is not limited to the aforementioned value, and any other scale values can be applied as long as allocated markers appropriately fall within the visual field. By drawing the converted virtual objects based on the current image capture position and orientation, the designation positions and orientations can be presented to the user using a miniature space shown in FIG. 20.

[Seventh Embodiment]

In the fourth embodiment, the designation positions and orientations are calculated using the data analyzing unit. However, the present invention is not limited to such calculation method of the designation positions and orientations using the data analyzing unit. For example, a system operator other than the user may store designation positions and orientations in advance in the storage unit 1204, and 3D guide CGs may be presented using the designation positions and orientations stored in advance. At the same time, the priority order of the designation positions and orientations may be set in the storage unit 1204, and numbers or symbols such as alphabets or the like indicating the priority or order of image capture operations may be displayed as a part of each 3D guide CG, as shown in FIG. 22.

As for details of the arrangement and processing of the seventh embodiment, a main difference from the fourth embodiment will be explained below.

A main difference from the fourth embodiment in the arrangement of the image capture environment calibration method of the seventh embodiment is the presence/absence of the data analyzing unit. In the seventh embodiment, upon completion of the processing of the image capture position and orientation estimation unit 1203, the image position and orientation designation unit 1206 executes processing without any data analysis.

Also, a main difference from the fourth embodiment in the processing of the image capture environment calibration method of the seventh embodiment is the presence/absence of the processes of steps S1403 and S1404. In the seventh embodiment, upon completion of the processing in step S1402, the process advances to step S1405 to read out the designation positions and orientations and their priority order stored in the designation position and orientation sequence in the storage unit 1204. Then, numbers 2201, 2202, and 2203 indicating the image capture order are displayed as 3D guide CGs inside or near the HMD objects 2000A to 2000C.

[Eighth Embodiment]

In the fourth embodiment, an image saving instruction is received from the user using the designation unit 111. If the current image capture position and orientation have values sufficiently close to the designation position and orientation, an image may be automatically captured and may be saved in the storage unit 1204.

A main difference from the fourth embodiment in the arrangement of the image capture environment calibration method of the eighth embodiment is the presence/absence of the designation unit 111. A main difference from the fourth embodiment in the processing of the image capture environment calibration method of the eighth embodiment is to check in step S1406 if "the image capture position and orientation have values close to the designation position and orientation" in place of checking if "the saving instruction is generated". In step S1406 of the eighth embodiment, the current image capture position and orientation are compared with each designation position and orientation in the designation position and orientation sequence in the storage unit 1204. If at least one of the differences between these positions and orientations is equal to or smaller than a threshold, the process advances to step S1407.

[Ninth Embodiment]

In the fourth embodiment, an image to be acquired to calibrate the relative position and orientation of each marker allocated on the physical space in the marker calibration is designated for the user by displaying the 3D guide CG for designating the position and orientation of the image capturing unit 101. However, the present invention is not limited to the time of execution of the marker calibration for obtaining geometric information of a target included in a captured image. For example, Japanese Patent Laid-Open No. 2003-269913 (corresponding US 2003/0182072A1) discloses processing for calculating and calibrating allocation (geometric) information of a position and orientation sensor which measures by another method which uses a landmark included in a captured image and is not based on the captured image. In Japanese Patent Laid-Open No. 2003-269913, an image of a landmark allocated on the physical space is captured using the image capturing unit 101, and the output values of an image capture position and orientation measuring unit at the image capture timing are stored. The position and orientation on a sensor coordinate system 2601 (FIG. 26) uniquely defined by the position and orientation sensor on a reference coordinate system 2602, the positions and orientations of the image capturing unit 101 and measurement point of the position and orientation sensor, and the like are calculated and calibrated. The present invention can also be applied to such calculation and calibration of the allocation (geometric) information of the position and orientation sensor.

The ninth embodiment will exemplify a case wherein the present invention is applied to processing for calibrating the position and orientation of a magnetic sensor allocated on the physical space for the purpose of implementation of a mixed reality presentation apparatus.

In order to implement mixed reality, the position of the image capturing unit 101 on the reference coordinate system 2602 must be measured. However, output values output from a general 3D position and orientation sensor are the position and orientation of a measurement point (to be referred to as a measurement receiver 2303 hereinafter) on the sensor coordinate system 2601 uniquely defined by the sensor, but are not those of the image capturing unit on the world coordinate system. Therefore, the sensor output values cannot be used as the position and orientation of the image capturing unit on the world coordinate system intact, and must undergo some calibration. As an execution example of this calibration, the sensor calibration method disclosed in reference Y. Tsai is known. Even in this sensor calibration method, in order to precisely obtain the calibration result of the allocation information of the sensor, a landmark image obtained by capturing an image of each landmark allocated on the physical space from an appropriate position and orientation must be acquired.

FIG. 26 shows the relationship between allocation information $M_{CS}$ between the image capturing unit 101 and measurement receiver 2303, and allocation information $M_{TW}$ of a measurement transmitter 2304 on the reference coordinate system as those to be calibrated in this embodiment. Note that the ninth embodiment expresses the allocation information using a 4×4 matrix that represents the position and orientation. These two pieces of allocation information $M_{CS}$ and $M_{TW}$ are fixed on the space. Also, $M_{ST}$ indicates the position and orientation of the measurement receiver 2303 on the sensor coordinate system 2601 as the measurement values of the magnetic sensor. If the two pieces of allocation information $M_{CS}$ and $M_{TW}$ and the sensor measurement values $M_{ST}$ can be calculated, the position and orientation $M_{CW}$ of the image capturing unit 101 on the reference coordinate system 2602 can be calculated.

At this time, $M_{CW}$ can be described by:

$$M_{CW}=M_{CS} \cdot M_{ST} \cdot M_{TW} \qquad (10)$$

Figure 24:
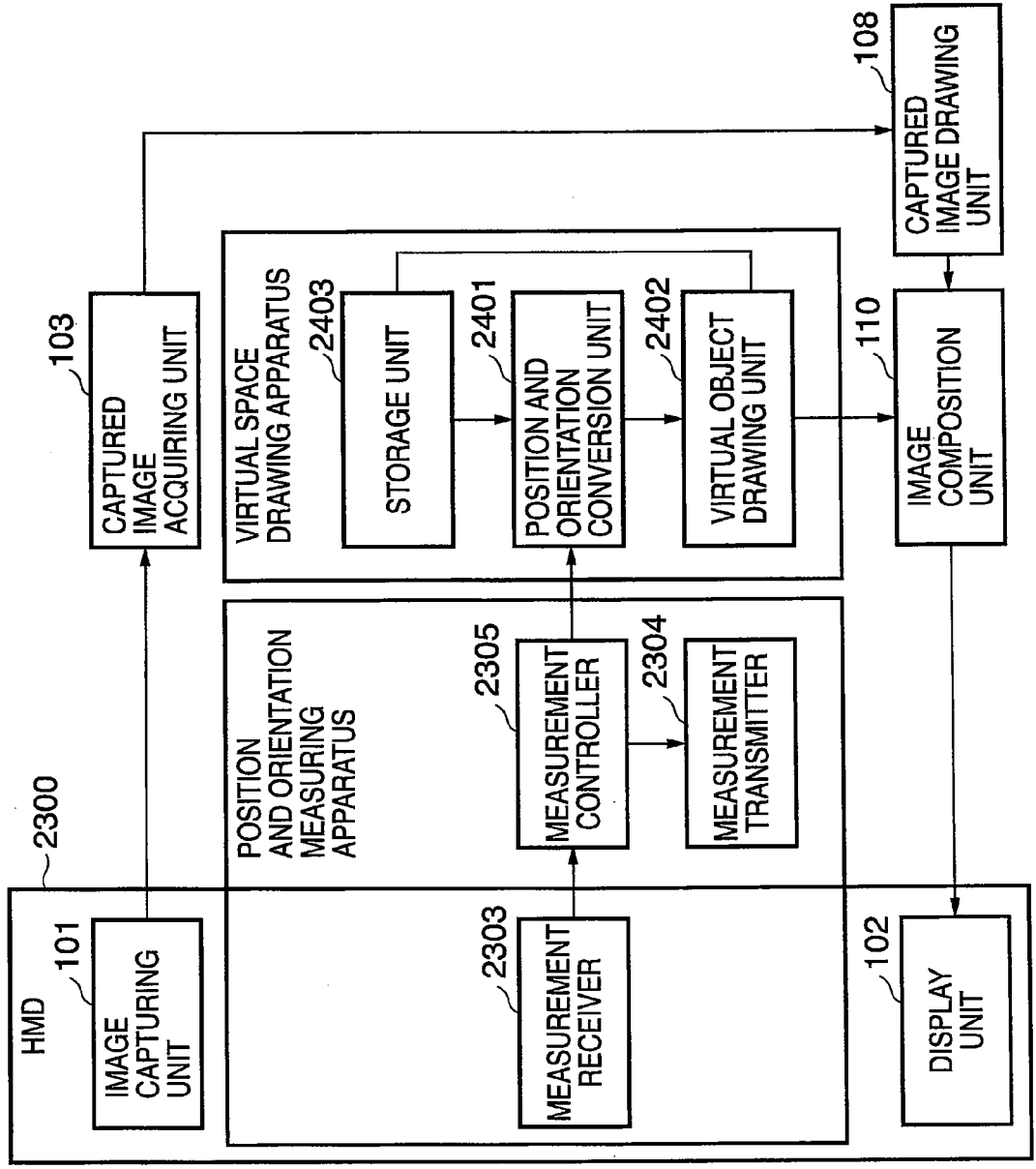
FIG. 24 is a block diagram showing the functional arrangement of a mixed reality presentation apparatus.

FIG. 24 is a block diagram showing the functional arrangement for implementing a general mixed reality presentation apparatus using a position and orientation sensor. Note that the same reference numerals in FIG. 24 denote components having the same functions as those in FIG. 12.

The measurement receiver 2303 represents a receiver of a magnetic sensor fixed to an HMD 2300. The ninth embodiment uses FASTRAK as a magnetic sensor available from Polhemus as the position and orientation sensor. This measurement receiver 2303 sends the intensity of the received magnetic field to a measurement controller 2305.

The measurement transmitter 2304 represents a transmitter of the magnetic sensor FASTRAK allocated on the physical space. The measurement controller 2305 receives the reception result of the measurement receiver 2303, and measures the position and orientation $M_{ST}$, on the sensor coordinate system 2601, of the measurement receiver 2303 fixed to the image capturing unit 101 to be measured (see FIG. 26). In the ninth embodiment, this measurement controller 2305 represents a controller of FASTRAK.

A position and orientation conversion unit 2401 reads out the position and orientation $M_{ST}$ of the measurement receiver 2303 on the sensor coordinate system 2601 obtained by the measurement controller 2305, and two pieces of sensor calibration information $M_{CS}$ and $M_{TW}$ stored in a storage unit 2403. Then, the unit 2401 calculates $M_{CS}$ by equation (10).

A virtual object drawing unit 2402 reads out vertex information of a virtual object stored in the storage unit 2403 using the calculated $M_{CW}$ as a viewing transformation matrix, thus drawing a virtual space image. The storage unit 2403 manages information required to implement the mixed reality presentation apparatus. For example, the storage unit 2403 manages, e.g., the two pieces of sensor calibration information $M_{CS}$ and $M_{TW}$, the vertex information of the virtual object to be superimposed, the camera intrinsic parameters of the image capturing unit 101, and the like.

In this manner, the image composition unit 110 superimposes the obtained virtual space image on the captured image, and displays a composite image on the display unit 102, thus presenting the mixed reality space to the user.

In order to implement the mixed reality presentation apparatus shown in FIG. 24, the two pieces of sensor calibration information $M_{CS}$ and $M_{TW}$ must be calibrated and must be stored in the storage unit 2403 in advance.

Figure 23:
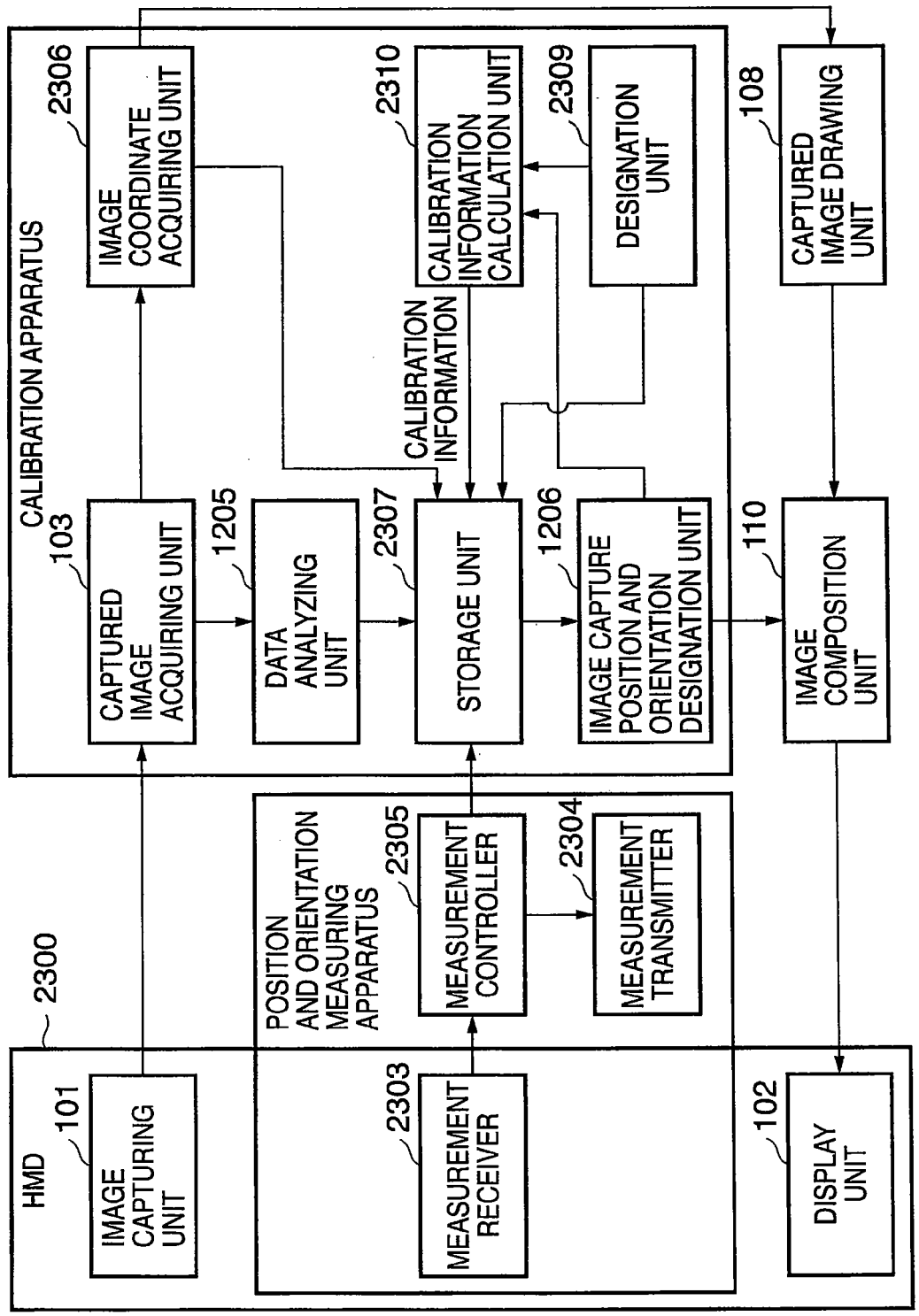
FIG. 23 is a block diagram showing the functional arrangement of the ninth embodiment.

FIG. 23 is a block diagram showing the functional arrangement of a calibration apparatus for calibrating such calibration information according to the ninth embodiment, to which the present invention is applied. Note that the same reference numerals in FIG. 23 denote components having the same functions as those in FIG. 24.

An image coordinate acquiring unit 2306 receives an image captured by the image capturing unit 101, and specifies a coordinate value on an image coordinate system of each landmark captured in that image and its identification number (identifier). Note that the ninth embodiment uses, as the landmarks, square markers of ARToolKit which are also used in the fourth embodiment. Detection and identification of the square markers are the same as those in the processing of the fourth embodiment. However, the present invention is not limited to the use of square markers as the landmarks, and may be applied to any other indices as long as they allow sensor calibration.

A storage unit 2307 holds information required for the processing of the image capture environment calibration method according to the ninth embodiment, and executes read and write processes according to the processing. Note that the information required for the processing of the image capture environment calibration method in this embodiment includes:

the marker data shown in FIG. 21 and pattern images inside the markers;

the two pieces of calibration information $M_{CS}$ and $M_{TW}$;

the saved captured images and saved sensor measurement values;

the vertex information of a virtual object to be drawn for the purpose of the position and orientation presentation;

the 2D positions of respective vertices of each square marker on the image coordinate system detected from the captured image;

the designation position and orientation sequence for storing the designation positions and orientations of the image capturing device;

flags used to discriminate a data acquisition command and calibration information calculation command input from a designation unit 2309;

a correspondence list which stores the image coordinate values of the square markers and the coordinate values on the reference coordinate system in association with each other; and so forth.

The data analyzing unit 1205 calculates the image capture position and orientation to capture a marker image required to precisely estimate the allocation information of the sensor with reference to the marker data obtained from the storage unit 2307. The image capture position and orientation designation unit 1206 draws 3D guide CGs based on the designation positions and orientations stored in the storage unit 2307.

Upon reception of the data acquisition command from the user, the designation unit 2309 stores a "data acquisition" flag in the storage unit 2307; upon reception of the calibration information calculation command from the user, it stores a "calibration information calculation" flag in the storage unit 2307.

A calibration information calculation unit 2310 calculates calibration information using the saved sensor measurement values and the 2D coordinate values of the square markers on the image coordinate system, which are detected from the captured image stored in the storage unit 2307 using the method disclosed in reference Y. Tsai. This calibration information calculation unit 2310 converts the 3D position and orientation of the marker data stored in the storage unit 2307 into the 3D coordinate values at the four vertices of each square marker. Since this conversion is a known method, a description thereof will not be given. Then, the unit 2310 calculates the position and orientation of the image capturing unit 101 on the reference coordinate system 2602 based on the detected vertex positions of each square marker, sensor coordinate values, and the two pieces of calibration information $M_{CS}$ and $M_{TW}$ in which predetermined initial values are set as parameters. Furthermore, the unit 2310 converts the 3D coordinate values corresponding to the respective vertices of each captured square marker into ideal values of the respective vertices on the image coordinate system by projective transformation calculated based on the camera intrinsic parameters. The unit 2310 reads out the vertex positions of each square marker detected on the captured image from the storage unit 2307, and associates them based on the information set in the list in the storage unit 2307. The unit 2310 calculates $M_{CS}$ and $M_{TW}$ as calibration information used to calculate correction values that minimize errors of the associated vertices on the image by an error minimization method. Please refer to reference Y. Tsai for details. The calibration information obtained in this way is stored in the storage unit 2307.

The processing sequence by the image capture environment calibration method configured by the block diagram shown in FIG. 23 will be described below with reference to the flowchart shown in FIG. 25.

Figure 25:
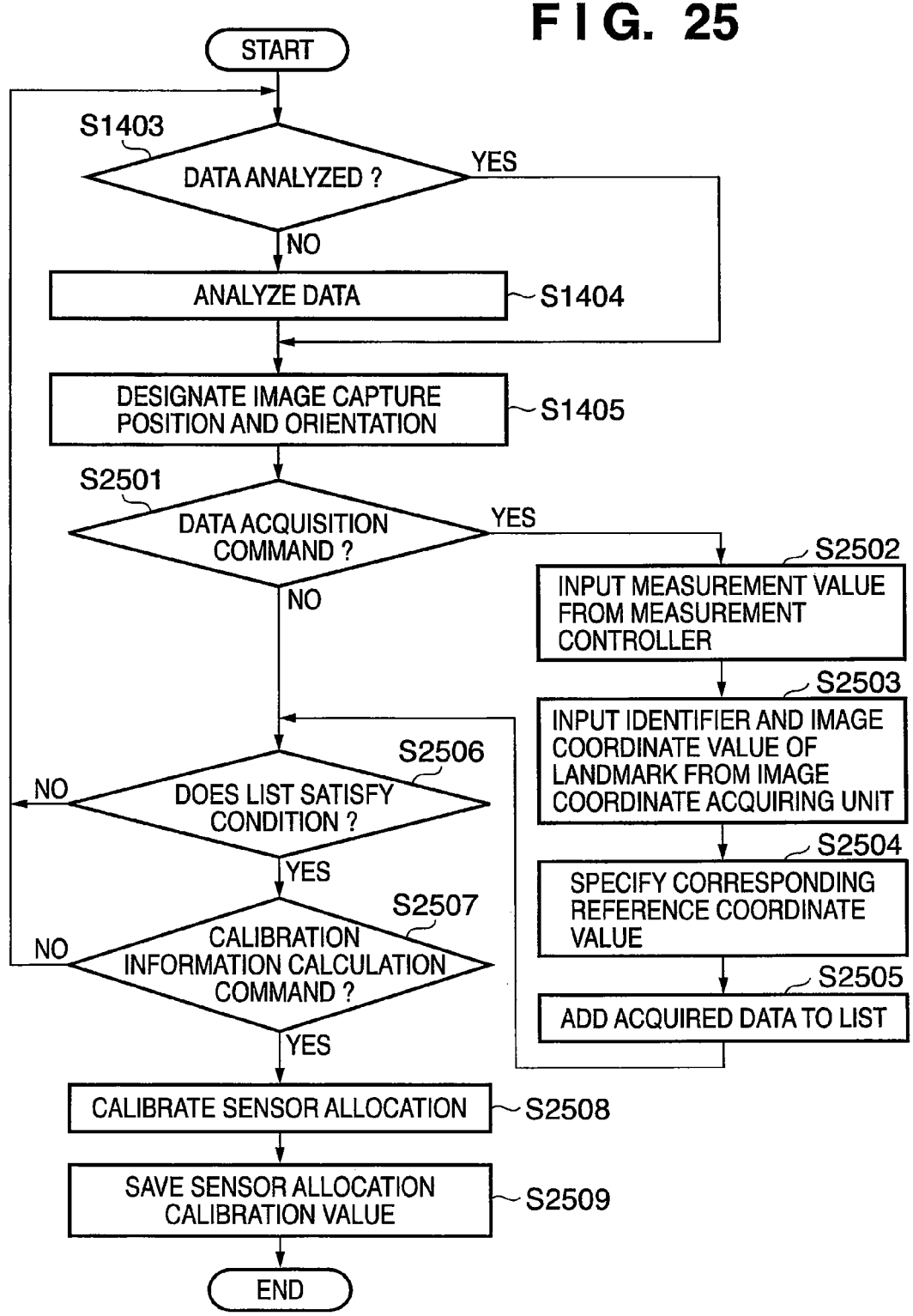
FIG. 25 is a flowchart showing a brief processing sequence of an image capture environment calibration method according to the ninth embodiment.

In steps S1403 to S1405 in FIG. 25, the marker data stored in the storage unit 2307 is analyzed to generate an optimal designation image capture position and orientation based on the marker data information, and a 3D guide CG is displayed based on the analysis result, as in the processing in FIG. 14.

It is checked in step S2501 if the flag of the data acquisition command is set in the storage unit 2307. If that flag is set, the process advances to step S2502; otherwise, the process advances to step S2506.

In step S2502, the measurement values are input from the measurement controller 2305 to the storage unit 2307. In step S2503, the image coordinate acquiring unit 2306 calculates the image coordinates of the landmark (square marker) and inputs them to the storage unit 2307 together with the identification ID of that landmark. Note that the identification ID is a unique ID used to identify each of landmarks 1301, 1302, and the like described in the marker data shown in FIG. 21. In step S2504, the 3D position and orientation of the marker data in the storage unit 2307 on the reference coordinate system corresponding to the identification ID of the square marker detected from the captured image are acquired. In step S2505, the image coordinate values of the square marker and the coordinate values on the reference coordinate system, which are associated with each other, are stored in the correspondence list in the storage unit 2307.

It is checked in step S2506 if the correspondence list acquired so far has information that suffices to calibrate the allocation information of the sensor. If conditions are satisfied, the process advances to step S2507; otherwise, the process returns to step S1403. The calibration execution conditions for the sensor allocation information include that, for example, at least one square marker is identified, data are obtained at a plurality of viewpoint positions, and the total number of data is six or more.

It is checked in step S2507 if the flag of the calibration information calculation command is set in the storage unit 2307. If such flag is set, the process advances to step S2508; otherwise, the process returns to step S1403.

In step S2508, the calibration information calculation unit 2310 calculates the sensor calibration information. In step S2509, the sensor calibration information calculated in step S2508 is stored in the storage unit 2307.

As described above, according to the ninth embodiment, a pattern image required upon calibration of the sensor allocation information is automatically predicted, and the position where the user can capture that pattern image is presented to the user to guide him or her to that position. For this reason, even a beginner who does not know the algorithm or mechanism of the calibration of the marker position and orientation can precisely execute calibration of the marker position and orientation.

As described above, according to the embodiments of the present invention, upon calibrating the camera parameters, the shape and allocation information of an object on the physical space, the allocation information of the position and orientation sensor, and the like using an image, the image capture position and orientation is taught using the 3D guide CG on the 3D space. For this reason, even a beginner who does not know the mechanism of calibration and tends to cause errors upon inputting of image data can precisely execute calibration.

The embodiments of the present invention have been explained in detail. The present invention can adopt embodiments in the forms of a system, apparatus, method, program, storage medium, and the like. The present invention may be applied to either a system constituted by a plurality of devices, or an apparatus consisting of a single device.

Note that the present invention includes a case wherein the functions of the embodiments are achieved by directly or remotely supplying a software program to a system or apparatus, and reading out and executing the supplied program code by a computer of that system or apparatus. The program to be supplied in this case is that corresponding to each illustrated flowcharts in the embodiments.

Therefore, the program code itself installed in a computer to implement the functional processing of the present invention using the computer implements the present invention. Put differently, the present invention includes the computer program itself for implementing the functional processing of the present invention.

In this case, the form of program is not particularly limited, and an object code, a program to be executed by an interpreter, script data to be supplied to an OS, and the like may be used as long as they have the functions of the program.

As a recording medium for supplying the program, the following media can be used. For example, a Floppy® disk, hard disk, optical disk, magneto-optical disk, MO, CD-ROM, CD-R, CD-RW, magnetic tape, nonvolatile memory card, ROM, DVD (DVD-ROM, DVD-R), and the like can be used.

As another program supply method, the user establishes a connection to a homepage on the Internet using a browser on a client computer, and downloads the computer program of the present invention from the homepage onto a recording medium such as a hard disk or the like. In this case, the program to be downloaded may be a compressed file including an automatic installation function. Also, the program code that forms the program of the present invention may be segmented into a plurality of files, which may be downloaded from different homepages. In other words, the present invention includes a WWW server which makes a plurality of users download a program file required to implement the functional processing of the present invention by the computer.

Also, a storage medium such as a CD-ROM or the like, which stores the encrypted program of the present invention, may be delivered to the user. In this case, the user who has cleared a predetermined condition may be allowed to download key information used to decrypt the encrypted program from a homepage via the Internet. The user executes the encrypted program using the downloaded key information to install the program on a computer.

The functions of the aforementioned embodiments can be implemented when the computer executes the readout program. Furthermore, the functions of the aforementioned embodiments can be implemented in collaboration with an OS or the like running on the computer based on an instruction of that program. In this case, the OS or the like executes some or all of actual processes, which implement the functions of the aforementioned embodiments.

Furthermore, some or all of the functions of the aforementioned embodiments may be implemented when the program read out from the recording medium is written in a memory equipped on a function expansion board or a function expansion unit, which is inserted in or connected to the computer. In this case, after the program is written in the function expansion board or unit, a CPU equipped on the function expansion board or function expansion unit executes some or all of actual processes based on an instruction of that program.

As described above, according to the present invention, since the image capture position and orientation are taught on the 3D space as a 3D guide CG, even a beginner who does not know the mechanism of calibration and tends to cause errors upon inputting of image data can precisely execute calibration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-218975, filed Aug. 10, 2006, which is hereby incorporated by reference herein in its entirety.

What is claimed is:

1. A method of calibrating an image capture environment based on a captured image obtained by an image capturing unit, the method comprising:
    a deciding step of deciding a target position and orientation of the image capturing unit to be used to calibrate the image capture environment by referring to a history of the target position and orientation of the image capturing unit used for calibration;
    a presenting step of presenting a virtual object which designates the target position and orientation of the image capturing unit decided in the deciding step;
    a determination step of determining whether a current position and orientation of the image capturing unit matches with the target position and orientation of the image capturing unit designated by the virtual object;
    a notification step of notifying a user that the current position and orientation of the image capturing unit is appropriate to calibrate the image capture environment if it is determined that the current position and orientation matches with the target position and orientation in the determination step;
    an obtaining step of an image of the physical space captured by the image capturing unit at the position and orientation which is determined to match with the target position and orientation;
    a detecting step of detecting an index from the captured image of the physical space;
    a calibrating step of calibrating the image capture environment of image capturing unit using the index detected in the detecting step as a reference for calibration; and
    an updating step of updating the history of the target position and orientation of the image capturing unit based on the target position and orientation decided in the deciding step.

2. The method according to claim 1, wherein in the determination step, the target position and orientation are compared with a current position and orientation of the image capturing unit, and the current position and orientation is determined to match with the target position and orientation when a difference between the two sets of the positions and orientations falls within a predetermined range.

3. The method according to claim 2, wherein the virtual object is a virtual three-dimensional object.

4. An information processing apparatus for calibrating an image capture environment based on a captured image obtained by an image capturing device capturing an image of a physical space, said apparatus comprising:
    a deciding device adapted to decide a target position and orientation of the image capturing unit to be used to calibrate the image capture environment by referring to a history of the target position and orientation of the image capturing unit used for calibration;
    a designating device adapted to present a virtual object which designates the target position and orientation of the image capturing device decided by the deciding device;
    a determination device adapted to determine whether a current position and orientation of the image capturing unit matches with the target position and orientation of the image capturing unit designated by the virtual object;
    a notification device adapted to notify a user that the current position and orientation of the image capturing unit is appropriate to calibrate the image capture environment if it is determined that the current position and orientation matches with the target position and orientation by the determination device;
    an obtaining device adapted to obtain an image of the physical space captured by the image capturing unit at the position and orientation which is determined to match with the target position and orientation;
    a detecting device adapted to detect an index from the captured image of the physical space;
    a calibrating device adapted to execute calibration of the image capture environment using the index detected by said detecting device if the current position and orientation of the image capturing device has been determined to be appropriate; and
    an updating device adapted to update the history of the target position and orientation of the image capturing unit based on the target position and orientation decided by the deciding device.

5. A non-transitory computer-readable medium storing a control program for making a computer execute an image capture environment calibration method according to claim 1.

6. The method according to claim 1, wherein in the presenting step, a target position and orientation of the image capturing unit is determined based on the current position and orientation of the image capturing unit.

7. The method according to claim 1, wherein in the presenting step, a target position and orientation of the image capturing unit is determined based on a vanishing point direction of the captured image.

8. The method according to claim 1, wherein in the calibrating step, intrinsic parameter of the image capturing unit is calibrated.

9. The method according to claim 1, wherein in the calibrating step, a position and orientation of the index allocated on the physical space are calibrated.

10. The method according to claim 1, wherein the image capturing unit comprises a measuring unit which measures one of a position, an orientation, and a position and orientation of the image capturing unit on the physical space by another method which is not based on the captured image, and
in the calibrating step, the measuring unit is calibrated.

11. The method according to claim 3, wherein in the presenting step, the virtual three-dimensional object is three-dimensionally displayed at the target position and orientation on the physical space to be superimposed on an image of the physical space to have a real scale.

12. The method according to claim 1, wherein in the presenting step, a three-dimensional image configured based on a viewpoint that allows to look down at the index on the physical space, an object indicating the target position and orientation, and an object indicating a current image capture position, is superposed on an image of the physical space.

13. The method according to claim 1, wherein in the presenting step, the index on the physical space, an object indicating the target position and orientation, and an object indicating a current image capture position are reduced while maintaining an allocation relationship thereof, and the reduced images of the index and the objects are three-dimensionally displayed at predetermined positions on the physical space.

14. The method according to claim 1, wherein in the presenting step, the target position and orientation are compared with a current position and orientation of the image capturing unit, the target position and orientation are presented in a first display form if a difference between the two sets of positions and orientations falls outside a predetermined range, and the target position and orientation are presented in a second display form if the difference falls within the predetermined range.

15. The method according to claim 14, wherein the first display form displays an object which imitates an outer shape of the image capturing unit.

16. The method according to claim 14, wherein the second display form displays an image range to be captured by the image capturing unit.

17. The method according to claim 1, further comprising a second presenting step of presenting a message to prompt a user to capture an image is displayed when the current position and orientation of the image capturing unit has been determined to be appropriate.

18. The method according to claim 1, wherein in the presenting step, when there are a plurality of target positions and orientations, only one of a plurality of virtual objects which designate respective target positions and orientations is sequentially displayed, and the current target position and orientation is updated to the next target position and orientation when an image at the displayed target position and orientation is obtained.

19. The method according to claim 1, wherein in the presenting step, when there are a plurality of target positions and orientations, symbols indicating an image capture order are displayed near a plurality of objects that represent the target positions and orientations.

* * * * *